(12) United States Patent
Agata et al.

(10) Patent No.: US 7,296,242 B2
(45) Date of Patent: Nov. 13, 2007

(54) INFORMATION PROCESSING APPARATUS AND METHOD AND PROGRAM AND PROGRAM STORAGE MEDIUM

(75) Inventors: Hideyuki Agata, Tokyo (JP); Masakazu Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 09/844,563

(22) Filed: Apr. 27, 2001

(65) Prior Publication Data

US 2002/0054017 A1    May 9, 2002

(30) Foreign Application Priority Data

May 1, 2000    (JP)    ............................. 2000-132723

(51) Int. Cl.
*G06F 3/048* (2006.01)

(52) U.S. Cl. ..................... 715/793; 715/782; 715/848

(58) Field of Classification Search ................ 345/720, 345/721, 745, 770, 779, 789, 792, 821, 823, 345/834, 864; 715/789, 790, 794, 797, 782, 715/784, 785, 786, 792, 793, 848, 852, 853
See application file for complete search history.

(56) References Cited

U.S. PATENT DOCUMENTS

| | | | |
|---|---|---|---|
| 5,359,703 A | | 10/1994 | Robertson et al. |
| 5,485,439 A | | 1/1996 | Hamasaka et al. |
| 5,711,672 A | | 1/1998 | Redford et al. |
| 5,838,318 A | * | 11/1998 | Porter et al. ................ 715/790 |
| 5,917,488 A | | 6/1999 | Anderson et al. |
| 5,936,638 A | | 8/1999 | Hodgins et al. |
| 5,940,076 A | * | 8/1999 | Sommers et al. ........... 715/834 |
| 5,963,203 A | * | 10/1999 | Goldberg et al. ........... 715/723 |
| 6,067,398 A | | 5/2000 | Sato |
| 6,097,389 A | | 8/2000 | Morris et al. |
| 6,144,375 A | * | 11/2000 | Jain et al. ................... 345/420 |
| 6,160,553 A | | 12/2000 | Robertson et al. |
| 6,208,348 B1 | * | 3/2001 | Kaye .......................... 345/419 |
| 6,236,395 B1 | * | 5/2001 | Sezan et al. ................ 345/723 |
| 6,249,281 B1 | | 6/2001 | Chen et al. |
| 6,289,277 B1 | * | 9/2001 | Feyereisen et al. ......... 701/202 |

(Continued)

FOREIGN PATENT DOCUMENTS

EP    0609819 A1 *  10/1994

(Continued)

OTHER PUBLICATIONS

Bott, Using Windows 95, QUE, 1995.

*Primary Examiner*—Weilun Lo
*Assistant Examiner*—Truc T. Chuong
(74) *Attorney, Agent, or Firm*—Frommer Lawrence & Haug LLP; William S. Frommer; Thomas F. Presson

(57) ABSTRACT

The thumbnail icons representing content items stored in a Memory Stick are displayed as aligned in a linear manner. The sequence of the alignment of the thumbnail icons follows the sequence of the sort icons displayed in the control area. By rotating the jog dial, the user can scroll the thumbnail icons displayed in the view area. Rotating the jog dial, the user displays the thumbnail icon representing a desired content item as a selected thumbnail icon (at the center) and then presses the jog dial. Consequently, the content item represented by the selected thumbnail icon is reproduced.

18 Claims, 29 Drawing Sheets

U.S. PATENT DOCUMENTS

| | | |
|---|---|---|
| 6,333,752 B1 | 12/2001 | Hasegawa et al. |
| 6,335,742 B1 | 1/2002 | Takemoto |
| 6,335,746 B1 | 1/2002 | Enokida et al. |
| 6,405,362 B1 | 6/2002 | Shih et al. |
| 6,505,194 B1* | 1/2003 | Nikolovska et al. ............ 707/3 |
| 6,507,351 B1* | 1/2003 | Bixler ........................ 715/810 |
| 6,590,593 B1* | 7/2003 | Robertson et al. ........... 715/782 |
| 6,628,313 B1* | 9/2003 | Minakuchi et al. ......... 715/853 |
| 6,909,443 B1* | 6/2005 | Robertson et al. ........... 715/782 |
| 2002/0062437 A1* | 5/2002 | Shin et al. ..................... 713/2 |

FOREIGN PATENT DOCUMENTS

| | | |
|---|---|---|
| EP | 1 006 477 | 6/2000 |
| EP | 1 148 412 | 10/2001 |
| WO | WO 99 37075 | 7/1999 |

\* cited by examiner

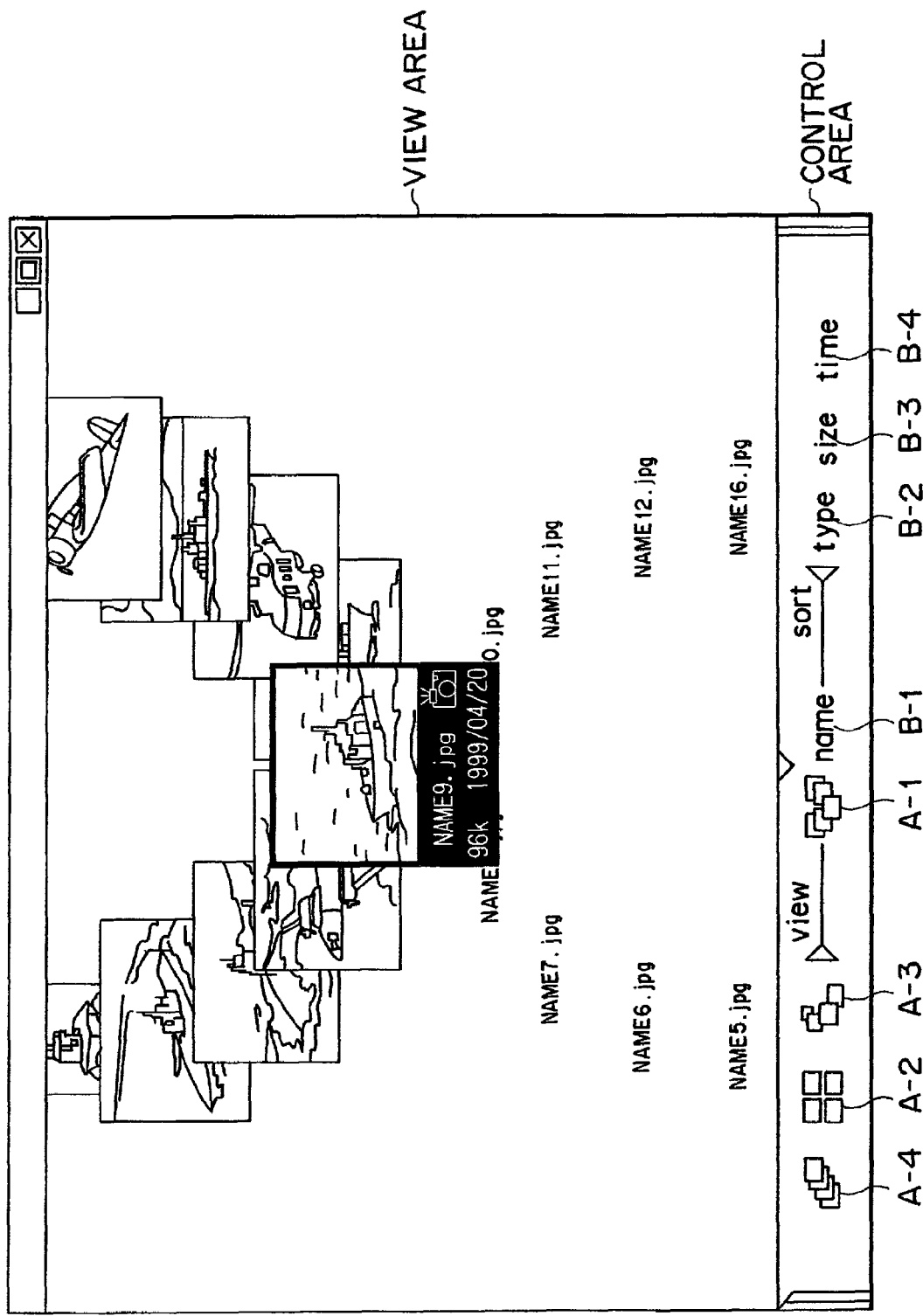

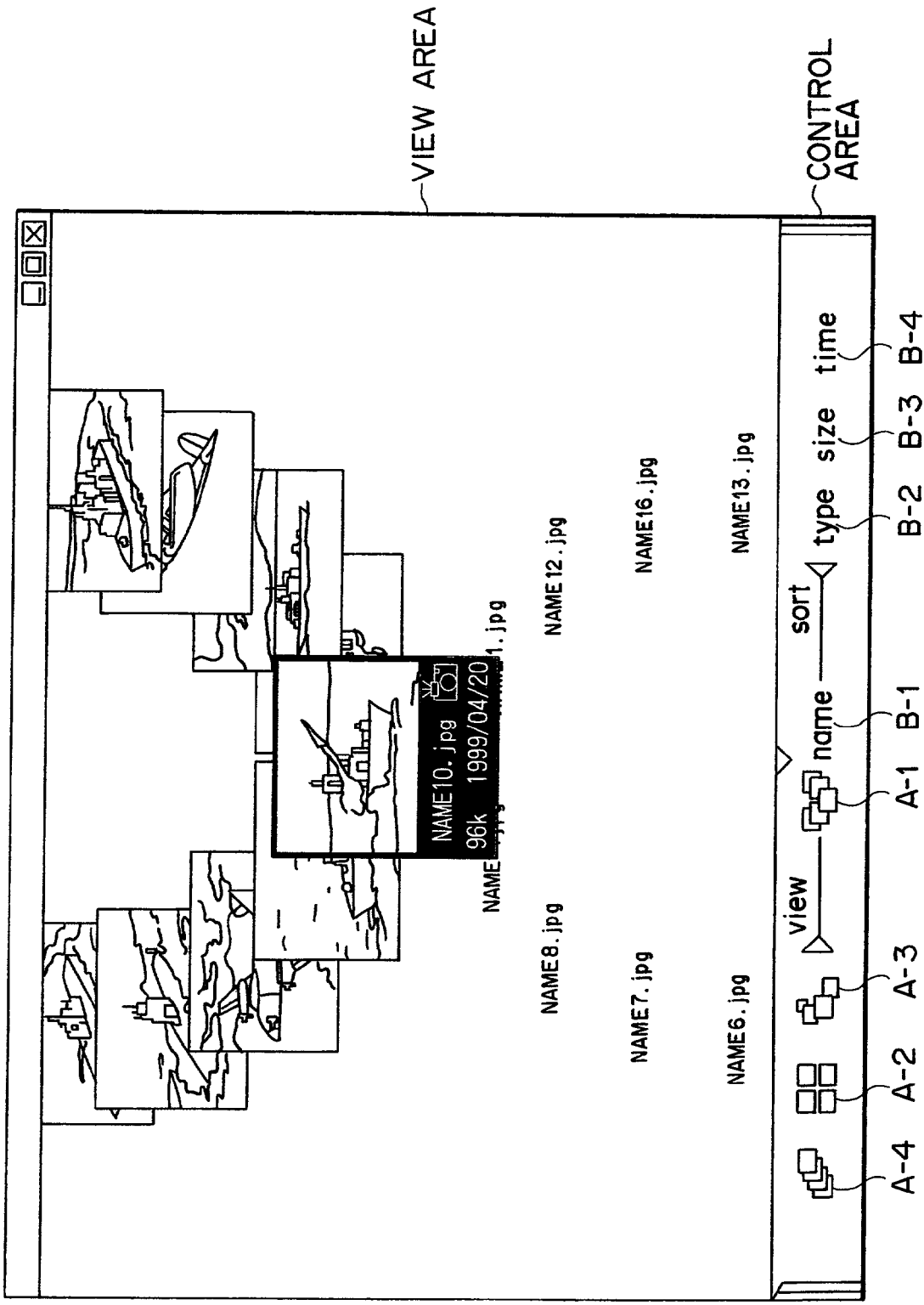

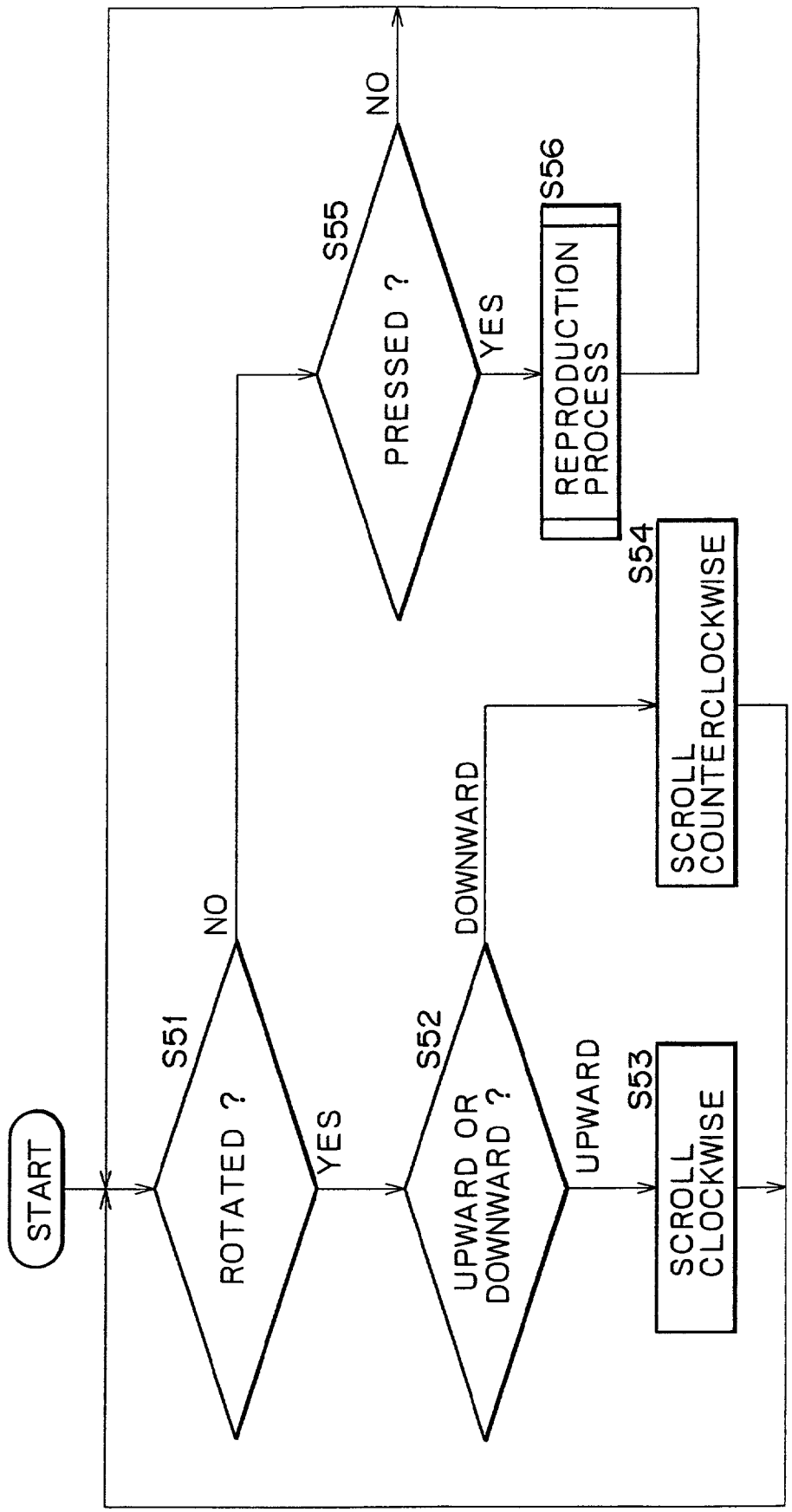

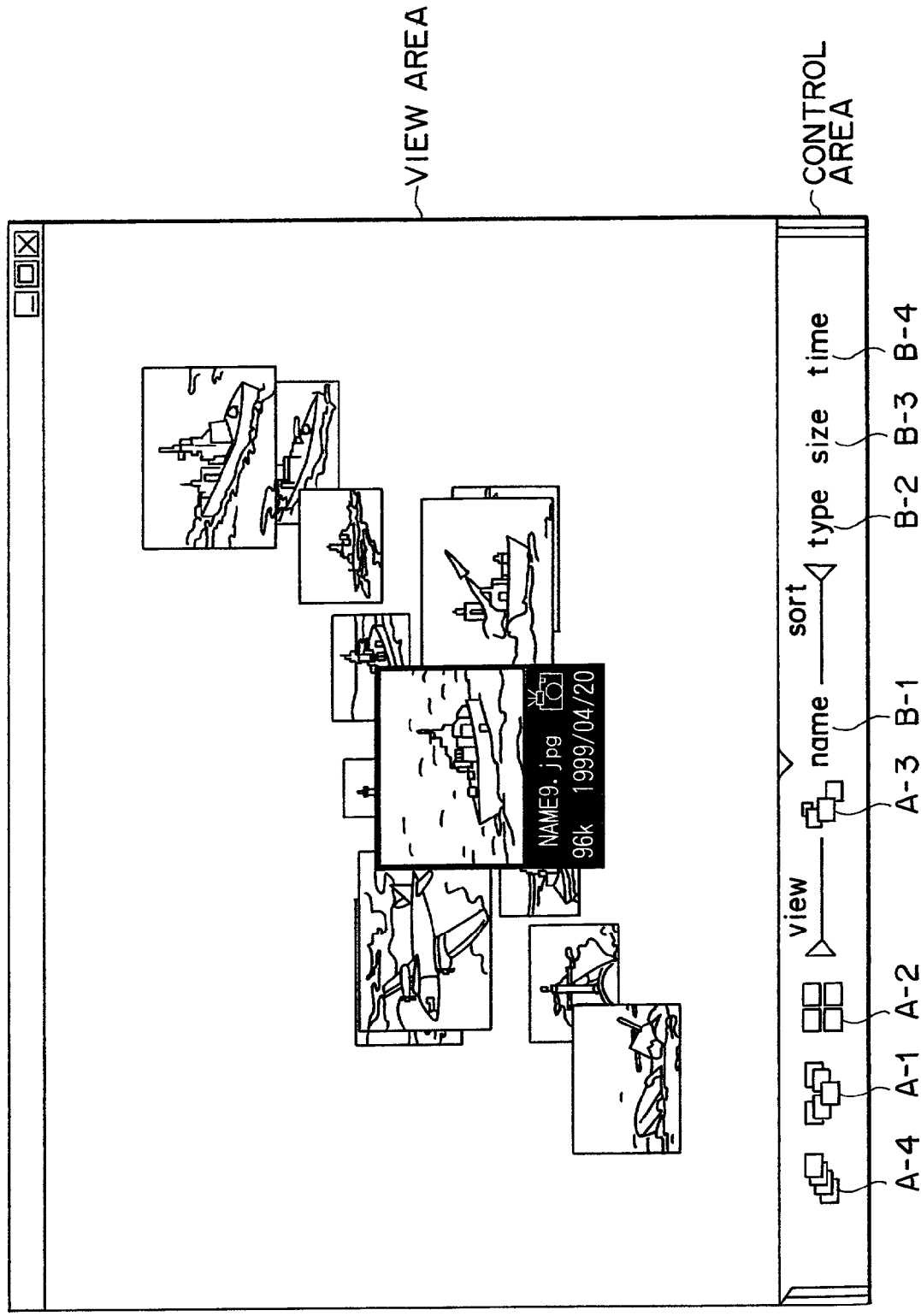

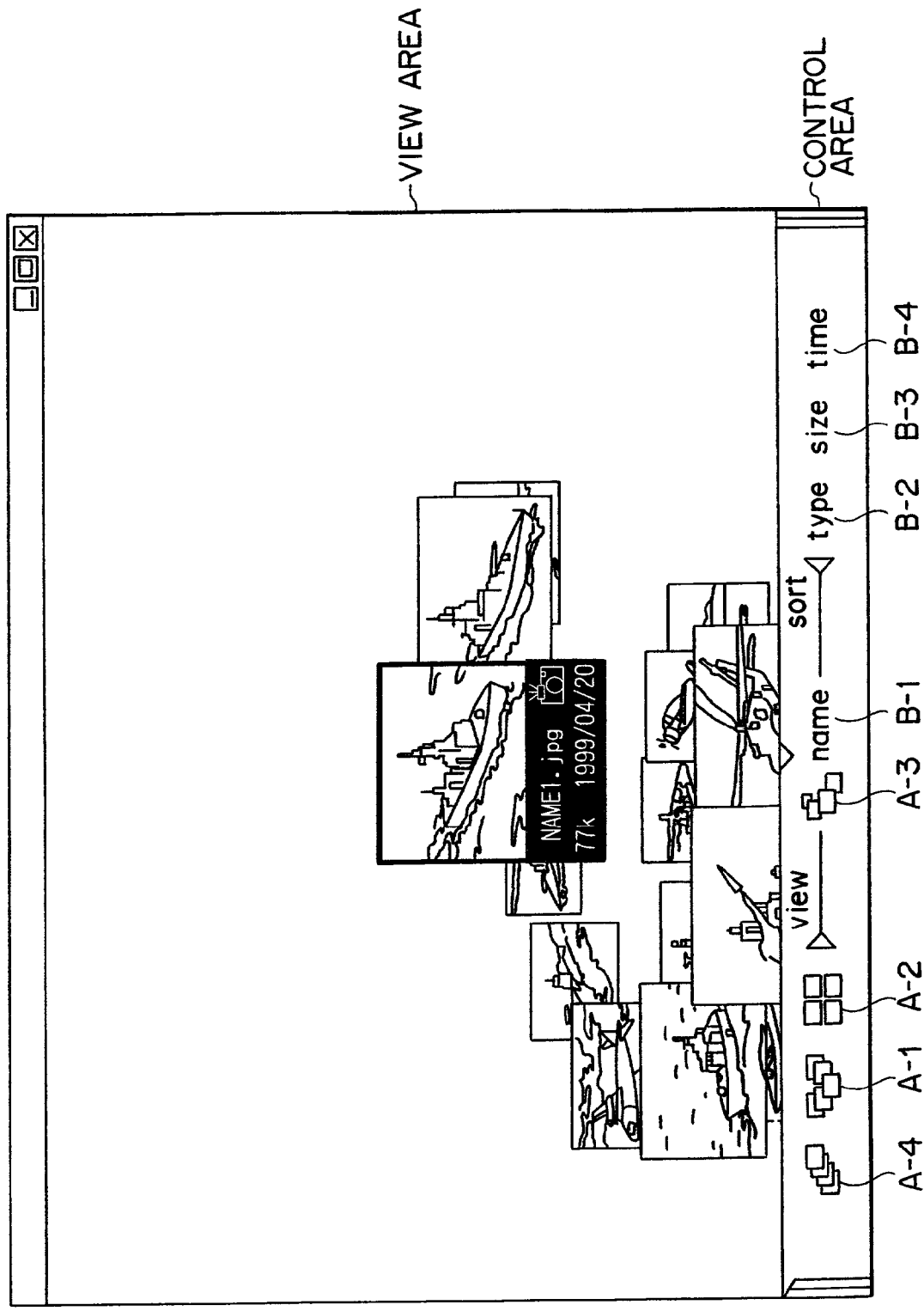

INFORMATION PROCESSING APPARATUS AND METHOD AND PROGRAM AND PROGRAM STORAGE MEDIUM

BACKGROUND OF THE INVENTION

The present invention relates generally to an information processing apparatus and method and a program and a program storage medium and, more particularly, to an information processing apparatus and method and a program and a program storage medium that allow users to easily browse the contents of recorded images and voices for example.

Information processing apparatuses have been developed in which an image for browsing (for example, a thumbnail image) of content recorded on a recording medium is displayed to allow a user to browse pieces of content to be viewed or listened.

The user operates a pointing device such as a mouse or a touch panel to switch between the displayed thumbnail images to reproduce desired content.

However, prior-art pointing devices are adapted for operation by moving the devices in a two-dimensional manner (vertically or horizontally) for example. The unfailing operation of such pointing devices requires some skill. Namely, novice users cannot always operate the pointing devices correctly, thereby making it difficult for the users to quickly browse content.

SUMMARY OF THE INVENTION

It is therefore an object of the present invention to allow users to easily and surely browse content.

To achieve the above object, according to a first aspect of the present invention, there is provided an information processing apparatus for executing predetermined processing in accordance with a first operation, a second operation, or a third operation performed through operating means, including: first display control means for controlling, in accordance with the first operation or the second operation performed through the operating means, the display of an image for browsing corresponding to content recorded on a recording medium; and reproduction means for reproducing content corresponding to the image for browsing of which display is kept in a selected state by the first display control means if the third operation has been performed through the operating means.

The first display control means preferably controls the display of the image for browsing such that the image for browsing is linearly aligned.

The first display control means preferably controls the display of the image for browsing such that the image for browsing is aligned in a curve which constitutes a circle.

The first display control means preferably controls the display of the image for browsing such that the image for browsing is spirally aligned in a three-dimensional space.

The first display control means preferably controls the display of the image for browsing such that the image for browsing is aligned in a planar manner.

Preferably, the information processing apparatus further includes: second display control means for controlling, in accordance with the first operation or the second operation performed through the operating means, the display of an icon of an application program which uses the content to be reproduced by the reproduction means; and starting means for starting, if the third operation is performed through the operating means with the display of an icon of a predetermined application program kept in an active state by the second display control means, the predetermined application program of which display of an icon is kept in the active state.

Preferably, when any display of the icon of the application program is kept in the active state by the second display control means and the third operation is performed through the operating means, the starting means ends the application program started.

Each of the first operation and the second operation is preferably performed by rotating or turning a rotating or turning type dial.

The third operation is preferably performed by depressing a rotating or turning type dial.

The first operation, the third operation, and the second operation are preferably performed by switches arranged substantially in straight-line in this order.

According to a second aspect of the present invention, there is provided an information processing method for an information processing apparatus for executing predetermined processing in accordance with a first operation, a second operation, or a third operation performed through operating means, including: a first display control step for controlling, in accordance with the first operation or the second operation performed through the operating means, the display of an image for browsing corresponding to content recorded on a recording medium; and a reproduction step for reproducing content corresponding to the image for browsing of which display is kept in a selected state in the first display control step if the third operation has been performed through the operating means.

Each of the first operation and the second operation is preferably performed by rotating or turning a rotating or turning type dial.

The third operation is preferably performed by depressing a rotating or turning type dial.

The first operation, the third operation, and the second operation are preferably performed by switches arranged substantially in straight-line in this order.

According to a third aspect of the present invention, there is provided a computer-readable program for controlling an information processing apparatus for executing predetermined processing in accordance with a first operation, a second operation, or a third operation performed through operating means, the computer-readable program including: a first display control step for controlling, in accordance with the first operation or the second operation performed through the operating means, the display of an image for browsing corresponding to content recorded on a recording medium; and a reproduction step for reproducing content corresponding to the image for browsing of which display is kept in a selected state in the first display control step if the third operation has been performed through the operating means.

Each of the first operation and the second operation is preferably performed by rotating or turning a rotating or turning type dial.

The third operation is preferably performed by depressing a rotating or turning type dial.

The first operation, the third operation, and the second operation are preferably performed by switches arranged substantially in straight-line in this order.

According to a fourth aspect of the present invention, there is provided a program storage medium for storing a computer-readable program for controlling an information processing apparatus for executing predetermined processing in accordance with a first operation, a second operation, or a third operation performed through operating means, the computer-readable program including: a first display control step for controlling, in accordance with the first operation or the second operation performed through the operating means, the display of an image for browsing corresponding to content recorded on a recording medium; and a reproduction step for reproducing content corresponding to the image for browsing of which display is kept in a selected state in the first display control step if the third operation has been performed through the operating means.

Each of the first operation and the second operation is preferably performed by rotating or turning a rotating or turning type dial.

The third operation is preferably performed by depressing a rotating or turning type dial.

The first operation, the third operation, and the second operation are preferably performed by switches arranged substantially in straight-line in this order.

In the information processing apparatus and method, and the program and program storage medium according to the present invention, the display of an image for browsing corresponding to content recorded on a recording medium is controlled in accordance with the first operation or the second operation performed through the operating means and, when the third operation is performed through the operating means, the content corresponding to the image for browsing of which display is kept in the selected state is reproduced.

BRIEF DESCRIPTION OF THE DRAWINGS

FIG. 14 is a diagram illustrating another display example of browsing screen;

FIG. 15 is a diagram illustrating still another display example of browsing screen;

FIG. 16 is a flowchart describing the processing procedure of the content browsing program 54D to be executed to browse contents in circle view;

FIG. 17 is a diagram illustrating yet another display example of browsing screen;

FIG. 18 is a diagram illustrating a different display example of browsing screen;

DETAILED DESCRIPTION OF THE PREFERRED EMBODIMENTS

Figure 1:
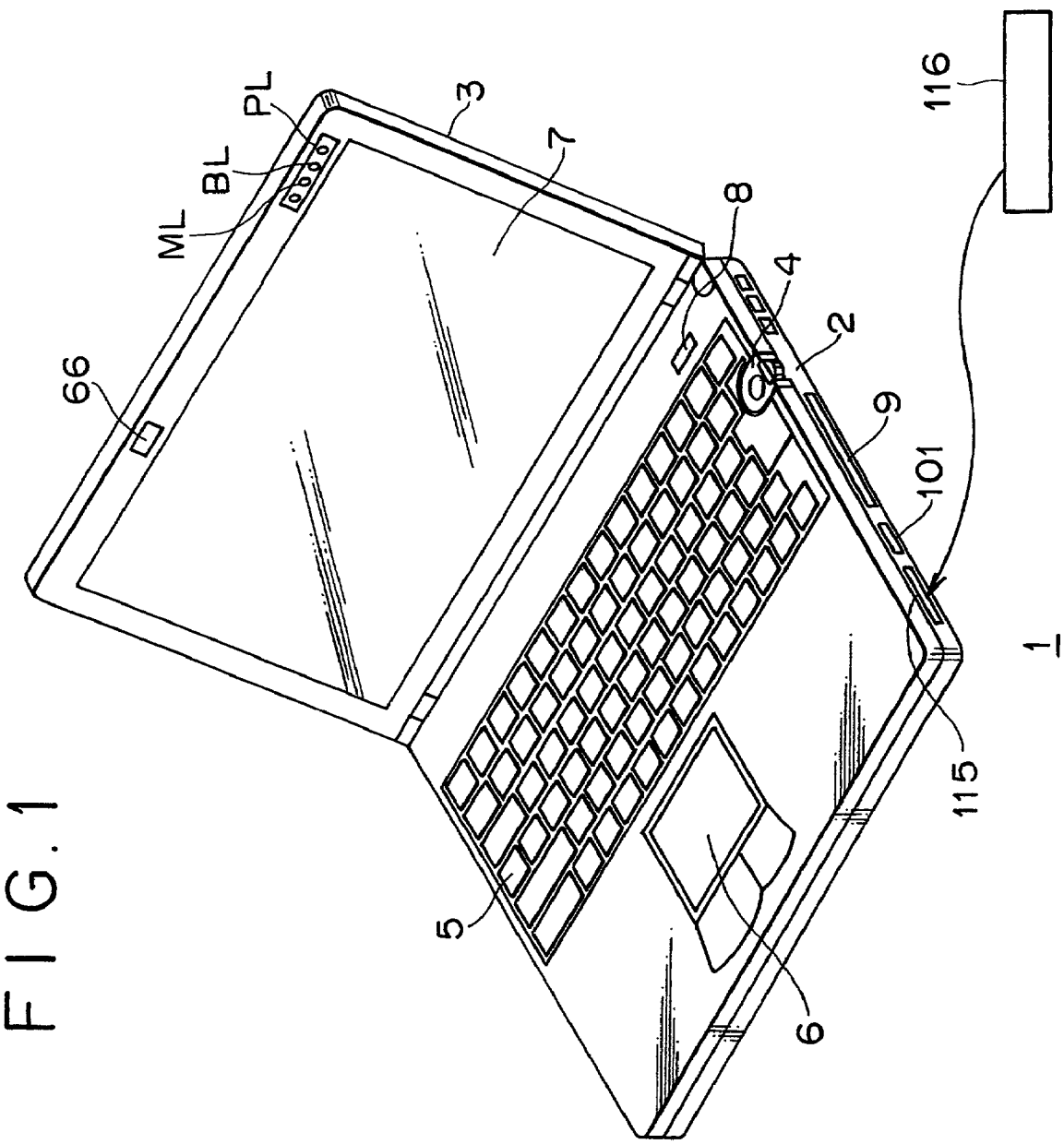
FIG. 1 is a perspective diagram illustrating an external view of a personal computer to which the present invention is applied.

FIGS. 1 shows an external view of a notebook personal computer 1 practiced as one embodiment of the present invention. The personal computer 1 is basically composed of a main body 2 and a display section 3 pivotally attached to the main body 2.

The main body 2 is arranged, on its top side, with a keyboard 5 which is operated to enter various characters and symbols, a touch pad 6, which is a point device for use in moving a pointer (or mouse cursor) displayed on an LCD 7, and a power switch 8. On one side of the main body 2, the jog dial 4, a slot 9, an IEEE 1394 port 101, a memory stick slot 115 in which a Memory Stick (trademark) 116 is loaded, etc. are arranged. It is also practical to arrange a stick-type pointing device instead of the touch pad 6.

On the front surface of the display section 3, the LCD (Liquid Crystal Display) 7 for displaying images is arranged. In the upper right corner of the LCD 7, such LED lights as a power light PL, a battery light BL, and, as required, a message light ML are arranged. A microphone 66 is arranged at the upper edge of the LCD 7. The power light PL, the battery light BL, and the message light ML may be arranged at the lower edge of the LCD 7.

Figure 2:
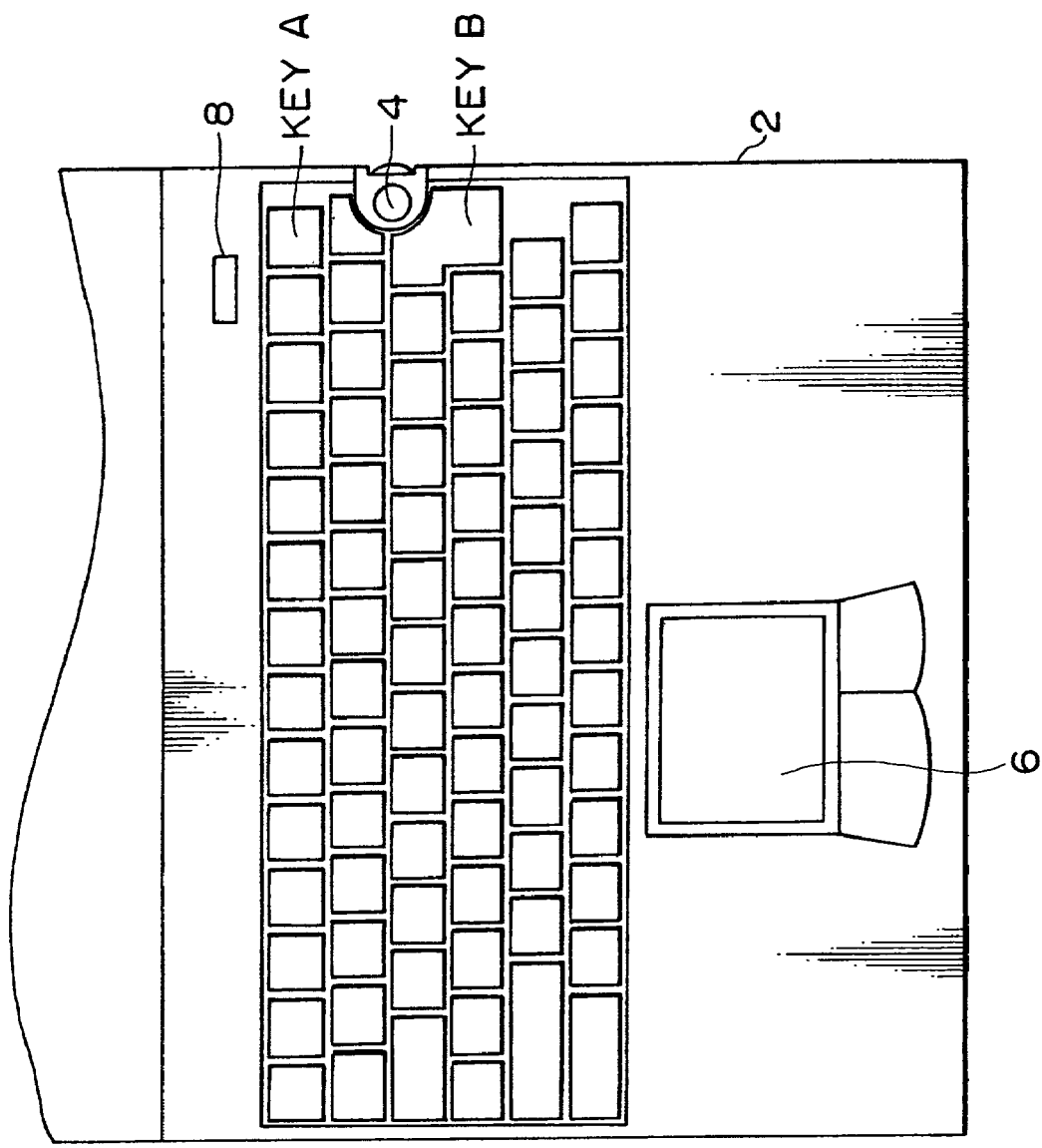
FIG. 2 is a top view illustrating the main body of the personal computer 1 shown in FIG. 1.
Figure 3:
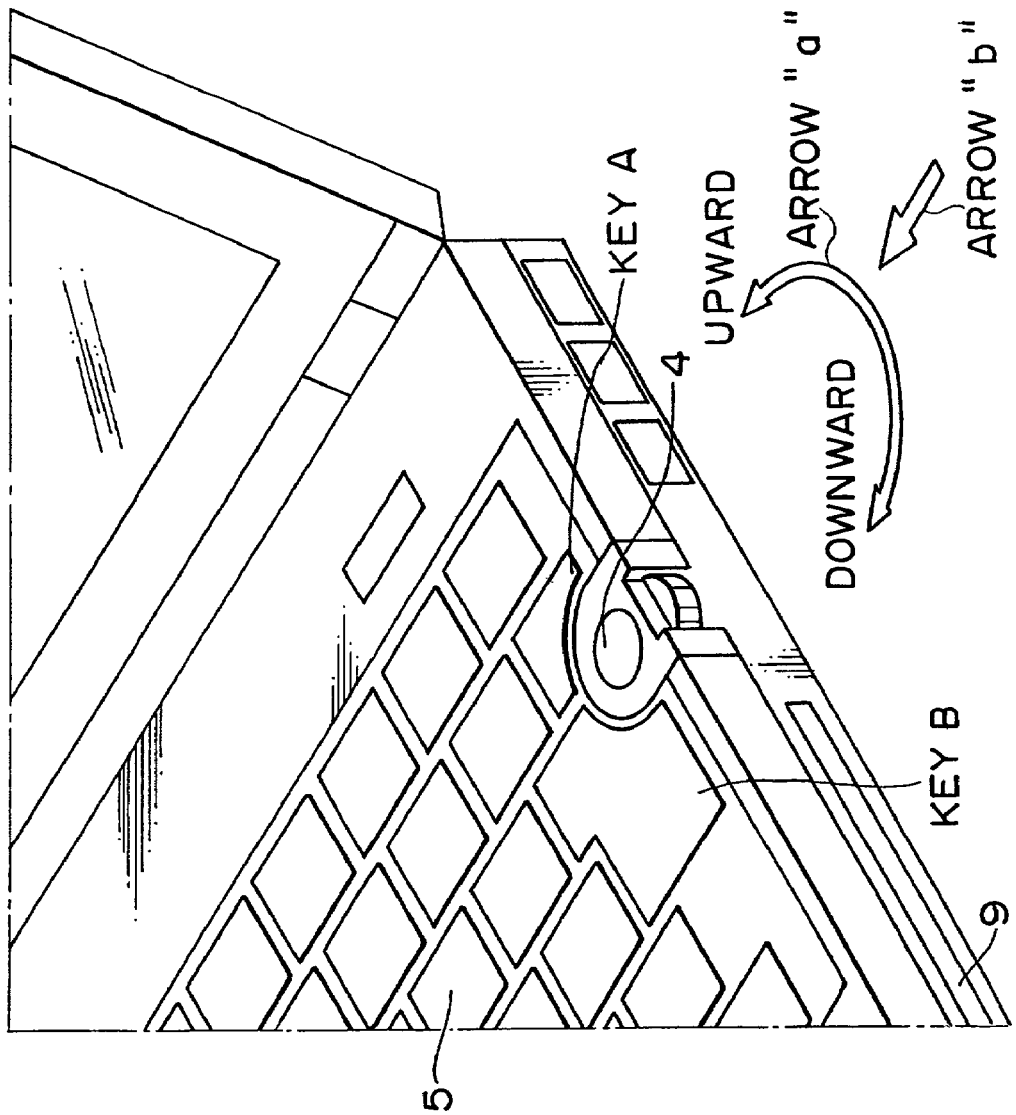
FIG. 3 is an enlarged partial perspective view illustrating a jog dial and its vicinity of the personal computer shown in FIG. 1.
Figure 4:
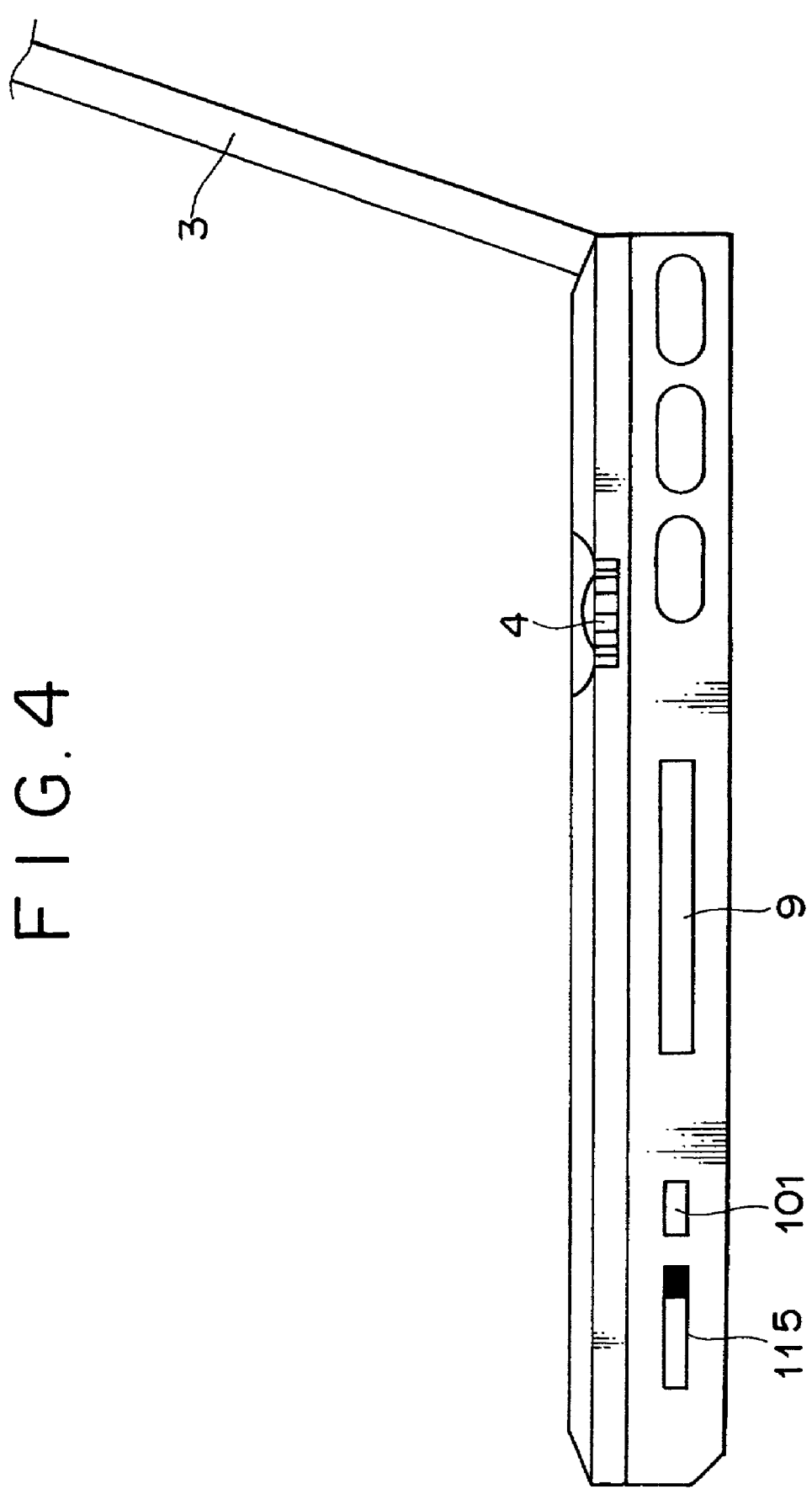
FIG. 4 is a right side view illustrating the right-side configuration of the personal computer shown in FIG. 1.

The jog dial 4 is mounted so that it comes between key A and key B arranged on the right side of the keyboard 5, the top surface of the jog dial 4 being approximately flush with the top surfaces of these keys as shown in the top view of the main body 2 of FIG. 2, the enlarged view of the main body 2 near the jog dial 4 of FIG. 3, or the side view of the main body 2 of FIG. 4. The jog dial 4 is rotated in the direction indicated by an arrow "a" shown in FIG. 3 and pressed in the direction indicated by an arrow "b".

The jog dial 4 may be arranged on the left side of the main body 2. The job dial 4 may also be arranged on the left or right surface of the display 3 or vertically between G key and H Key of the keyboard 5, not shown. The jog dial 4 may be arranged in a central portion of the front surface of the main body 2 so that the user can operate the jog dial 4 with the thumb while operating the touch pad with the index finger. The jog dial 4 may also be arranged horizontally along the upper rim or the lower rim of the touch pad 6 or vertically between the left and right buttons of the touch pad 6. The jog dial 4 may also be arranged not vertically or horizontally but diagonally at whose angle it is easy for the user to operate the jog dial 4. The jog dial 4 may be arranged at the side of the mouse, a pointing device, at which the user can operate the jog dial 4 with the belly of the thumb.

Figure 5:
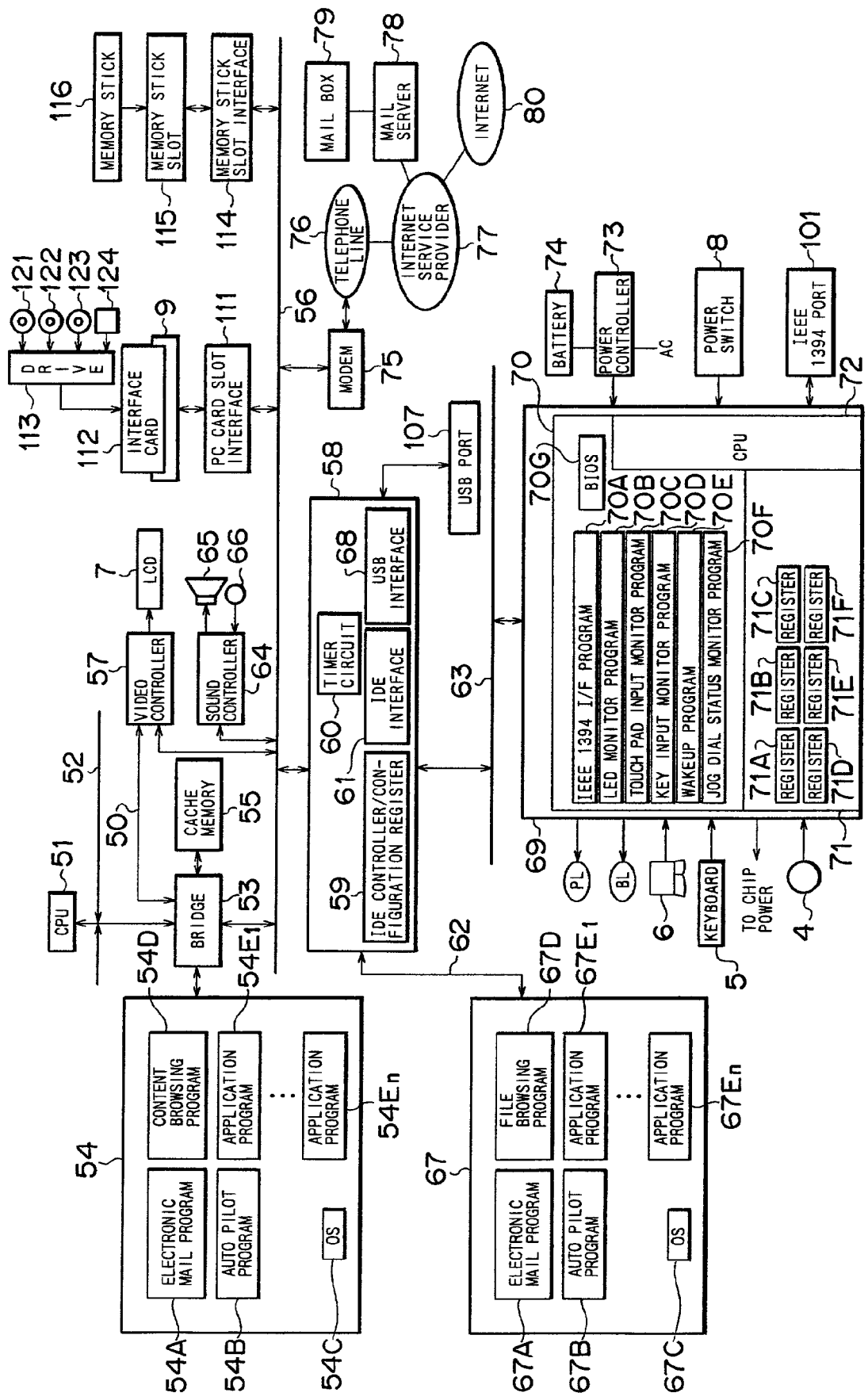
FIG. 5 is a block diagram illustrating an exemplary configuration of the inside of the personal computer shown in FIG. 1.

FIG. 5 is a block diagram illustrating the electrical configuration of the personal computer 1.

A host bus 52 is connected to a CPU (Central Processing Unit) 51 and a bridge 53. The CPU 51 is a Pentium (trademark) processor of Intel Corporation for example.

The bridge 53, connected to a RAM (Random Access Memory) 54 and a cache memory 55 and, via an AGP (Accelerated Graphics Port) 50, to a video controller 57. The bridge 53 is also connected to a PCI bus 56. The bridge 53, constituted by the 400BX of Intel Corporation, controls the peripherals of the CPU 51 and the RAM 54. It should be noted that the bridge 53 and a bridge 58 to be described constitute a so-called chipset.

The RAM 54, based on a DRAM (Dynamic Random Access Memory) for example, stores the programs to be executed by the CPU 51 and the data necessary for the CPU 51 to operate. To be more specific, the RAM 54 stores, upon completion of a bootup sequence of the personal computer 1, an electronic mail program 54A, an auto pilot program 54B, an operating system (OS) 54C, a content browsing 54D, and other application programs 54E1 through 54En loaded from a HDD 67.

The electronic mail program 54A transfers communication text over a communication line such as a telephone line 76 via a modem 75.

The auto pilot program 54B sequentially starts plural predetermined processes (or programs) in a predetermined order.

The OS 54C is a program, typically Windows 95 (trademark) or Windows 98 (trademark) of Microsoft Corporation or Mac OS (trademark) of Apple Computer for example, which controls the basic operations of the computer.

In response to an operation of the jog dial 4 for example, the content browsing program 54D executes the processing for displaying on the LCD 7 a thumbnail image indicative of the contents of an image or a voice recorded on the HDD 67 or the Memory Stick 116, for example. This processing will be described later.

The cache memory 55 stores data for use by the CPU 51. It should be noted that the CPU 51 incorporates a primary cache memory, not shown.

The video controller 57, connected to the PCI bus 56, controls the display of the LCD 7 on the basis of the data supplied via the PCI bus 56 or the AGP 50.

The sound controller 64, connected to the PCI bus 56, captures a signal representing a voice inputted from the microphone 66 and supplies a voice signal to a speaker 65.

Further, the PCI bus 56 is connected to the bridge 58, the modem 75, a PC card slot interface 111, and the Memory Stick slot interface 114.

The modem 75 can be connected to a communication network such as the Internet 80 or a mail server 78 via a telephone line 76 and an Internet service provider 77.

It should be noted that, appropriately loading an interface card 112 into the slot 9 connected to the PC card slot interface 111 allows the transfer of data with external devices. For example, connecting a drive 113 to the interface card 112 loaded in the slot 9 allows the transfer of data with a magnetic disc 121, an optical disc 122, a magneto-optical disc 123, or a semiconductor memory 124 loaded in the drive 113.

In addition, appropriately loading the Memory Stick 116 into the Memory Stick slot 115 connected to the Memory Stick slot interface 114 allows the transfer of data with the Memory Stick 116.

The bridge 58 is based on the PIIX4E of Intel Corporation for example and incorporates an IDE (Integrated Drive Electronics) controller/configuration register 59, a timer circuit 60, an IDE interface 61, and a USB (Universal Serial Bus) interface 68.

The bridge 58 executes control of a device (for example, the HDD 67) connected to the IDE bus 62 or a device connected to a USB port 107, or a device connected via an ISA/EIO (Industry Standard Architecture/Extended Input Output) bus 63 or an I/O interface 69.

The IDE controller/configuration register 59 of he bridge 58 is composed of two IDE controllers, so-called primary IDE controller and a so-called secondary IDE controller, and a configuration register.

The primary IDE controller is connected to the HDD 67 via its connector (not shown). The secondary IDE controller is electrically connected to an external device via another IDE bus (not shown).

The HDD 67 stores an electronic mail program 67A, an auto pilot program 67B, an OS 67C, a file browsing program 67D, and other application programs 67E1 through 67En and the data for use by these programs. The programs 67A through 67En stored in the HDD 67 are sequentially transferred and stored into the RAM 54 in a bootup sequence for example.

The I/O interface 69 connected to the bridge 58 through the ISA/EIO bus 63 is connected to the jog dial 4, the keyboard 5, the touch pad 6, and the IEEE 1934 port 101 through connectors, not shown.

When the user operates the jog dial 4, the touch pad 6, or the keyboard 5, an operation signal is inputted from the jog dial 4, the touch pad 6, or the keyboard 5 into the I/O interface 69, which outputs the received operation signal to the ISA/EIO bus 63. The I/O interface 69 transfers data with the outside via the IEEE 1394 port 101.

The I/O interface 69 is further connected to the power light PL, the battery light BL, the message light ML, and other LED lights and a power controller 73. The power controller 73 is connected to an incorporated battery 74 or an AC power outlet to supply power to each component and, at the same time, controls the charging of the secondary batteries of peripheral devices.

The I/O interface 69, a ROM (Read Only Memory) 70, a RAM 71, and a CPU 72 are interconnected for configuration. The ROM 70 stores an IEEE 1394 interface program 70A, a LED monitor program 70B, a touch pad input monitor program 70C, a key input monitor program 70D, a wakeup program 70E, and a jog dial status monitor program 70F.

The IEEE 1394 interface program 70A sends and receives data compliant with the IEEE 1394 standard via the IEEE 1394 port 101. The LED control program 70B controls the turn-on/off of the power light PL, the battery light BL, the message light ML as required, and other LED lights.

The touch pad input monitor program 70C monitors the input made by the user from the touch pad 6. The key input monitor program 70D monitors the input made by the user from the keyboard 5 or other key switches. The wakeup program 70E, which executes power management on each chip, checks, on the basis of the current time data supplied from the timer circuit 60 of the bridge 58, whether a predetermined time has been reached and, if the predetermined time has been reached, starts a predetermined process (or a program).

The jog dial status monitor program 70F always monitors whether the rotary encoder of the jog dial 4 has been rotated or the jog dial 4 has been pressed and supplies a monitor result to a predetermined program (for example, the content browsing program 54D loaded in the RAM 54) as required.

The ROM 70 also stores a BIOS (Basic Input/Output System) 70G. The BIOS 70G controls data transfer (input/output) between the OS or an application program and peripheral devices (a display, keyboard, HDD, etc.).

The RAM 71 stores registers 71A through 71F, namely a LED control register, a touch pad input status register, a key input status register, a setting time register, a jog dial status monitor I/O register, and an IEEE 1394 I/F register. For example, the LED control register controls the turn-on of the message light ML indicating the start-up of the electronic mail program 54A when the jog dial 4 is pressed. The key input status register holds a predetermined operated key flag when the jog dial 4 is pressed. The setting time register can be set a predetermined time.

The CPU 72 monitors, via the I/O interface 69, the power switch 8 which is operated to turn on/off the power.

In addition, when the power switch 8 is in the off state, the CPU 72 can execute the programs, the IEEE 1394 I/F program 70A through the BIOS 70G, stored in the ROM 70 by use of the internal power. Namely, if none of the windows is open on the LCD 7 of the display section 3, or if the OS 54C is not operating, these programs, the IEEE 1394 I/F program 70A through the BIOS 70G, are always operating.

Therefore, since the jog dial status monitor program 70F are always operating, when the user only presses the jog dial 4 even in the power save mode or with the power being off, a desired software program or script file can be started. Namely, in the personal computer 1, the jog dial 4 has a programmable power key (PPK) feature, so that no dedicated key need be arranged.

The following describes the content browsing processing to be executed by the content browsing program 54D. When the content browsing processing is executed, a thumbnail image of content is displayed on the LCD 7 as an icon, by means of which the user can browse the content. In this example, it is assumed that the Memory Stick 116 stores content such as still image, moving image, or voice and this program is executed to browse the content. Also, in this example, a thumbnail image of moving image is the image of a first frame, the thumbnail image of still image is the image of that still image, and the thumbnail image of voice content is a predetermined image corresponding to the voice data.

Figure 6:
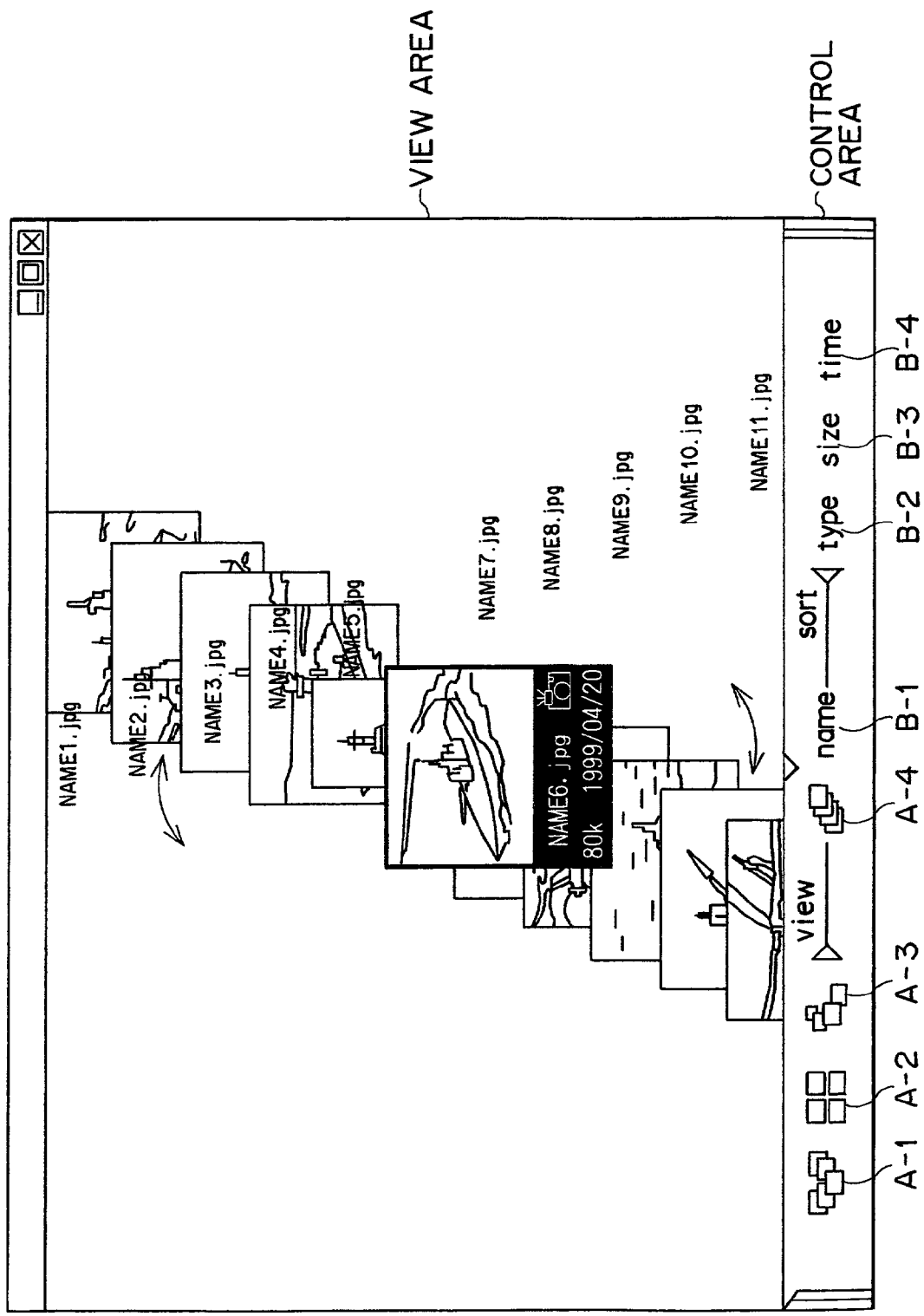
FIG. 6 is a diagram illustrating a display example of browsing screen.

A configuration of the screen for content browsing (hereinafter referred to as a browsing screen) will be described first. This browsing screen is made up of a view area arranged at the center of the screen and a control area arranged below the view area as shown in FIG. 6, for example.

Figure 21:
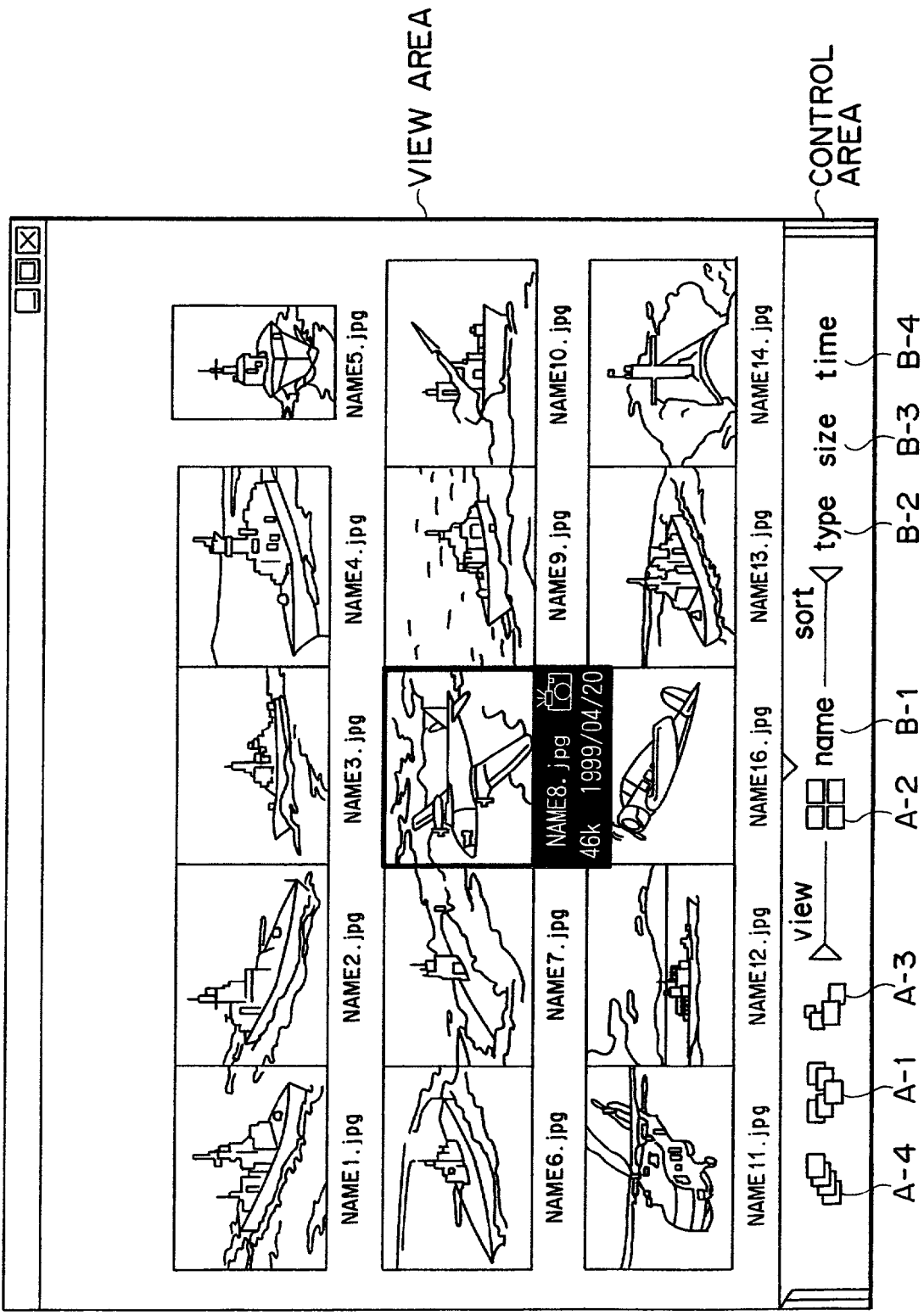
FIG. 21 is a diagram illustrating another display example of browsing screen.

The view area displays thumbnail images as icons (hereinafter referred to thumbnail icons) in various forms. For example, as shown in the view area shown in FIG. 6, thumbnail icons are aligned linearly (along a straight line extending horizontally) (hereinafter, this alignment is referred to as a line view) or along a curve constituting a circle as shown in FIG. 14 (hereinafter, this alignment is referred to as a circle view). In addition, as shown in FIG. 17, thumbnail icons are aligned spirally in a three-dimensional manner (hereinafter this alignment is referred to as a spiral view) or in a planar manner (horizontally or vertically) (hereinafter this alignment is referred to as a planar view) as shown in FIG. 21. Each of these alignment views will be described later.

In the control area, icons representing display forms (hereinafter referred to as display form icons) are aligned on the left and icons corresponding to the alignment sequence of thumbnail icons (hereinafter referred to as a sort icon) is aligned to the right of the display form icons.

In this example, the display form icons are an icon A-1 representing the circle view, an icon A-2 representing the planar view, an icon A-3 representing the spiral view, and an icon A-4 representing the line view.

Also, in this example, in each of the above-mentioned display forms, thumbnail icons can be aligned in the order of content names (alphabetically for example), content attributes (for example, moving image, still image, or voice), content sizes (recording capacity sizes) or content recorded dates. Namely, for the sort icons, an icon B-1 representing the sequence of names, an icon B-2 representing the sequence of attributes, an icon B-3 representing the sequence of recording capacity sizes, and an icon B-4 representing the sequence of recording dates are displayed.

It should be noted that one of the display form icons and one of the sort icons displayed in the control area are selected, the selected icons A and B move to the center of the control area, and these icons are displayed in a manner that the icon A is indicated by an arrow "view" and the icon B is indicated by an arrow "sort" as shown in the figure. The control area of the browsing screen shown in FIG. 6 indicates that the display form icon A-4 and the sort icon B-1 are selected.

The following describes the processing for content browsing by each of thumbnail icon display forms.

First, the processing of content browsing by the line view will be described.

The view area of a browsing screen in the line view displays the thumbnail icons representing content stored in the Memory Stick 116 in a linear manner as shown in FIG. 6. The sequence of alignment of these thumbnail icons follows the sequence specified by the corresponding sort icon in the control area. In the example shown in FIG. 6, the icon B-1 which corresponds the sorting of the thumbnail icons in the sequence of their names is selected, so that the thumbnail icons are aligned in the sequence of content names.

In this alignment of thumbnail icons, one of them is displayed at the center of the view area (hereinafter, the thumbnail icon displayed at the center of the view area is referred to appropriately as a selected thumbnail icon) and the other icons are aligned in a manner swinging left and right as indicates by curved arrows around the selected icon.

The selected thumbnail icon (displayed at the center of the view area) is displayed in its entirety and attached with a corresponding content name (name 6), attribute (JPG, an image of camera), recording capacity (80K), and recording date (Apr. 4, 1999) below the icon, having a frame around it.

The thumbnail icons other than the selected thumbnail icon are displayed overlapped each other. The content names and attributes of these thumbnail icons are displayed in correspondence with the display positions of these icons.

Consequently, the user, in the view area of the browsing screen, can browse the entire thumbnail image of the selected thumbnail icon and the corresponding content name, attribute, size, and recording date. At the same time, the user can browse the parts of the other thumbnail icons and their content names and attributes.

In addition, the user can scroll the thumbnail icons displayed in the view area by rotating the jog dial 4 (in the direction indicated by an arrow "a" shown in FIG. 3). When the job dial 4 is rotated upward, all thumbnail icons are scrolled down by an amount equivalent to the rotational angle for example. Namely, the thumbnail icons move downward, the thumbnail icons displayed below disappearing from the view area and news thumbnail icons entering the upper portion of the view area.

Figure 7:
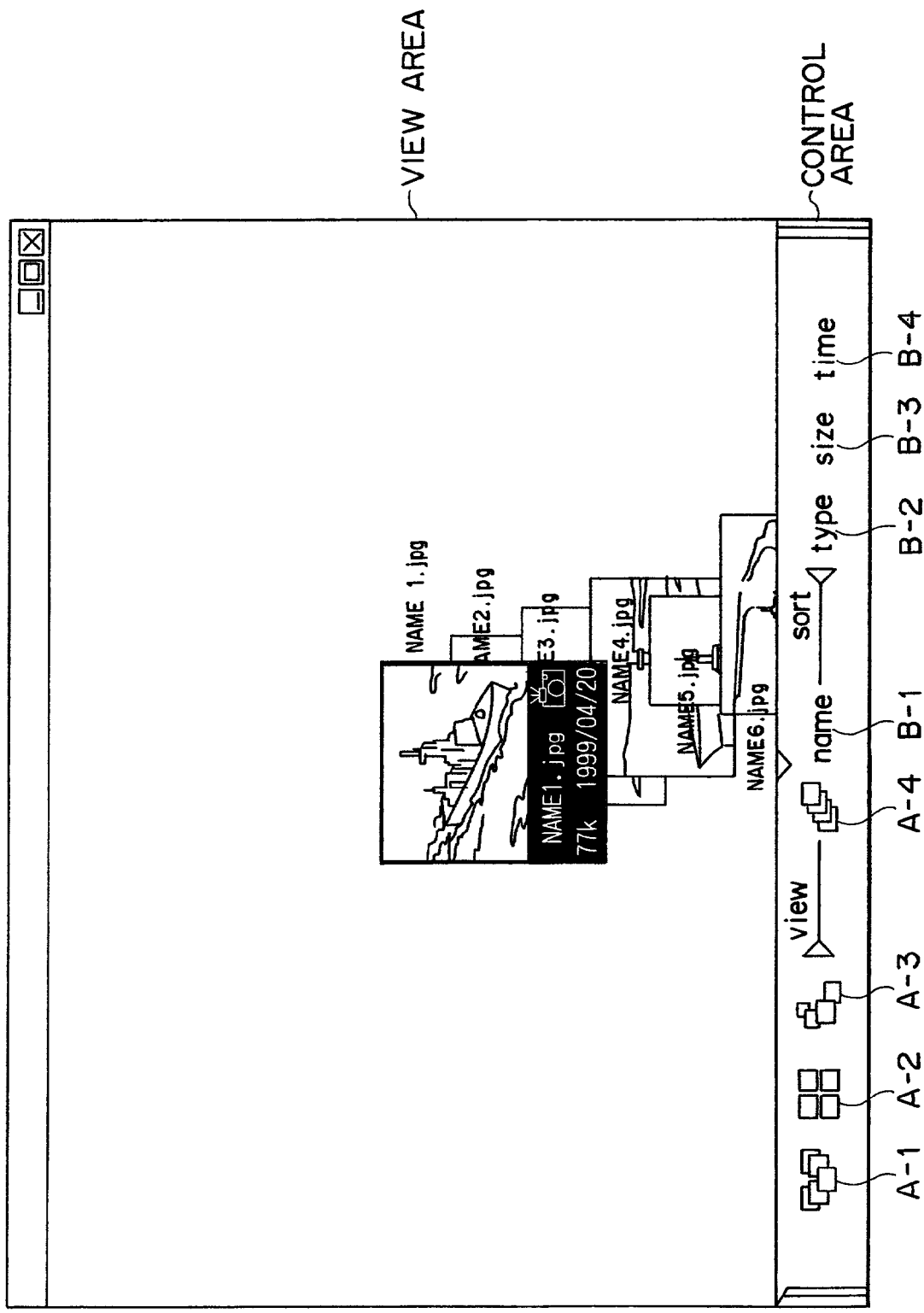
FIG. 7 is a diagram illustrating another display example of browsing screen.

In the view area of a browsing screen shown in FIG. 7, the thumbnail icon of "name 1" foremost of a thumbnail alignment (for example, the first thumbnail icon in the sequence of content names) is displayed as the selected thumbnail icon as a result of rotating the jog dial 4 upward to scroll the alignment of icons down. It should be noted that, if the jog dial 4 is rotated further up in this state, the alignment of icons will not be scrolled further down.

On the other hand, if the jog dial 4 is rotated downward, the alignment of thumbnail icons is scrolled up by an amount equivalent to the rotational angle. Namely, all displayed thumbnail icons move upward. In the example shown in FIG. 6, the thumbnail icons displayed in the upper portion of the view area disappear from the view area and new thumbnail icons enter the lower portion of the view area.

Figure 8:
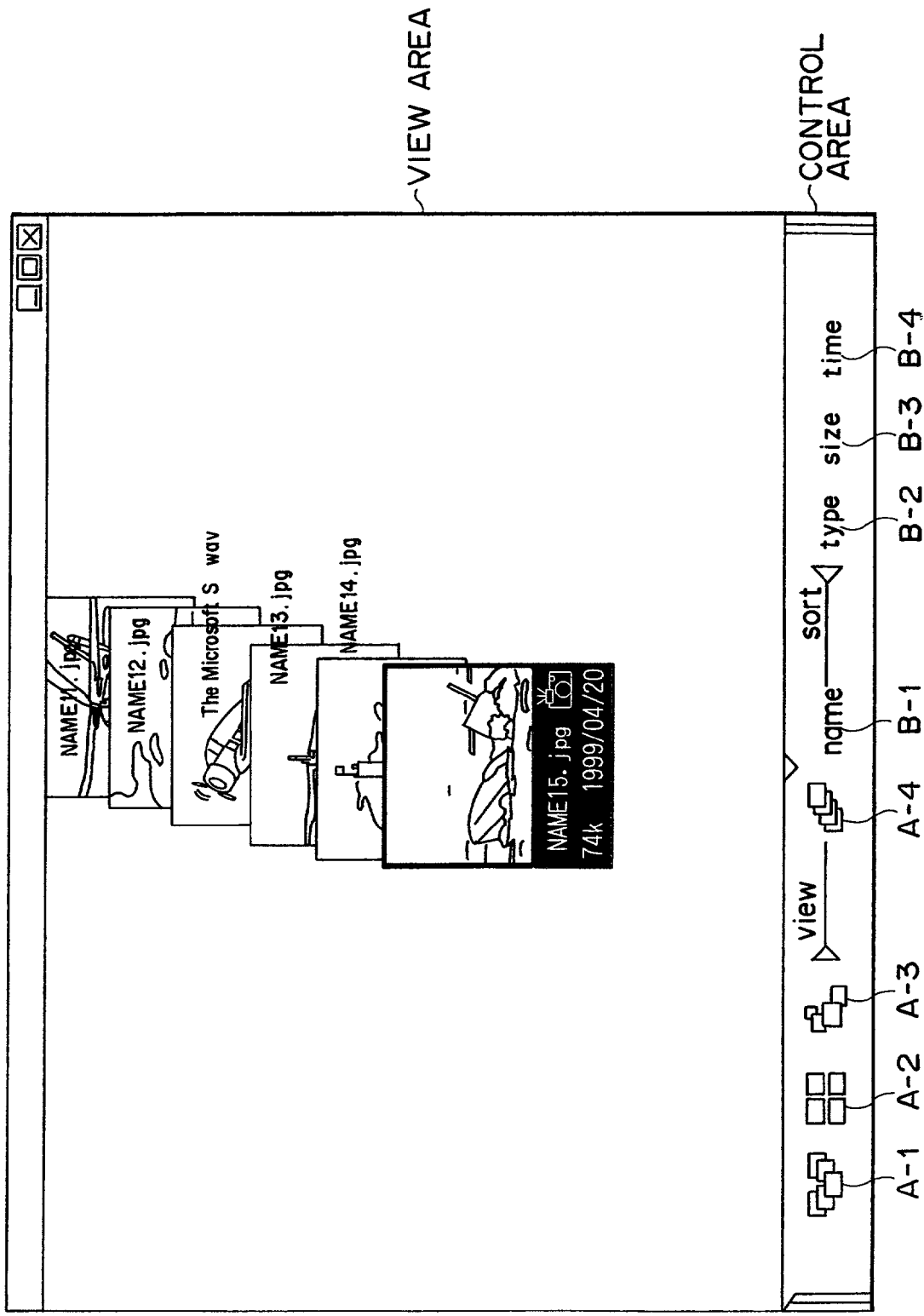
FIG. 8 is a diagram illustrating still another display example of browsing screen.

In the view area of a browsing screen shown in FIG. 8, the thumbnail icon corresponding to the icon of "name 15" at the end of an alignment of icons (for example, the last thumbnail icon in the sequence of content names) is displayed as the selected thumbnail icon as a result of rotating the jog dial 4 downward to scroll the alignment of thumbnail icons upward. It should be noted that, if the jog dial 4 is rotated further downward, the alignment of thumbnail icons will not be scrolled further up.

Thus, the user can browse all pieces (all thumbnail icons) of content stored in the Memory Stick 116.

In addition, as a result of browsing, when the user finds a desired piece of content, the user can view or listen it.

Figure 9:
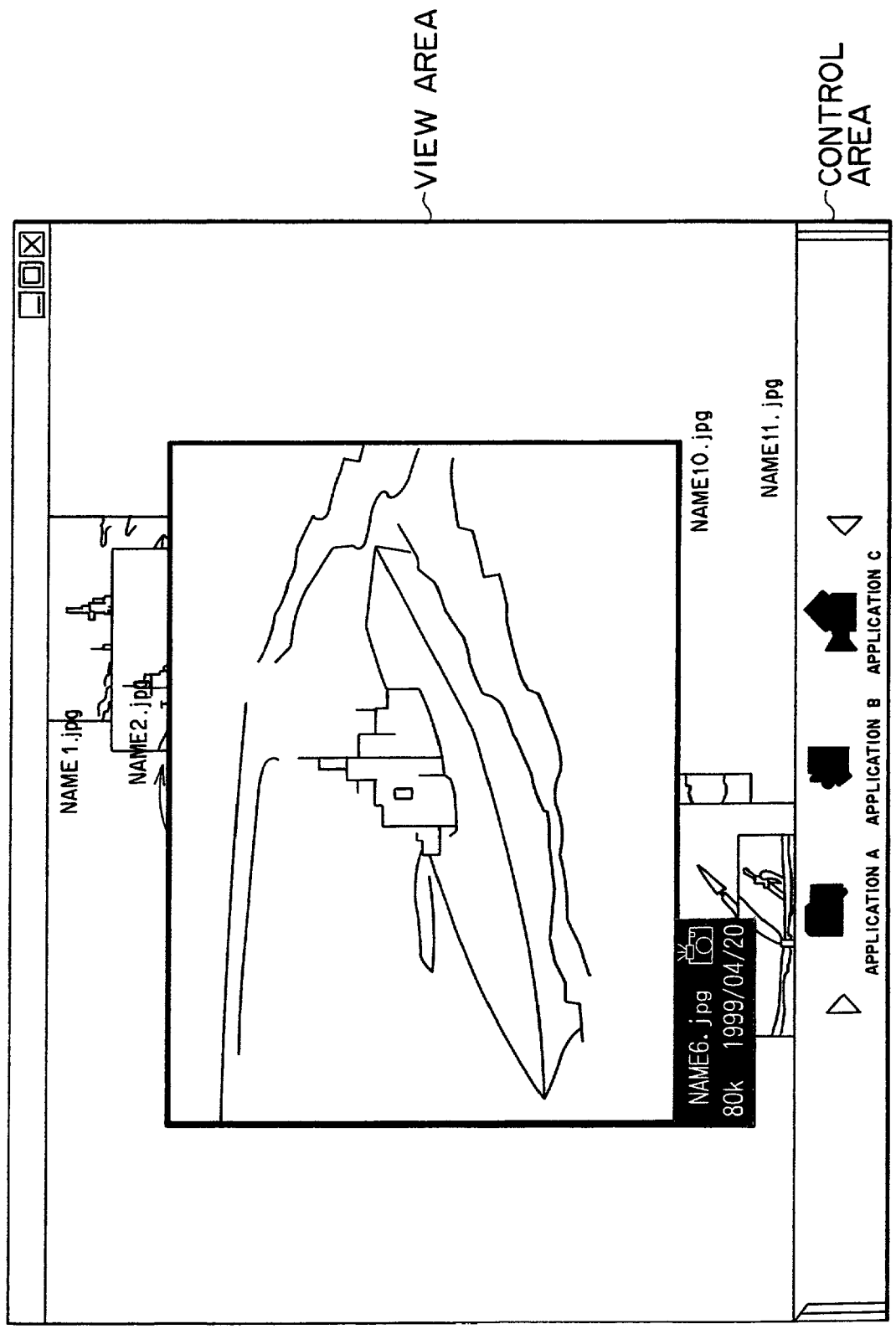
FIG. 9 is a diagram illustrating yet another display example of browsing screen.

When the user rotates the jog dial 4 and displays the thumbnail icon representative of a desired piece of content as the selected thumbnail icon, the user presses the jog dial 4 (moves the jog dial 4 in the direction indicated by an arrow "b" shown in FIG. 3). Consequently, the desired piece of content is reproduced. For example, if the desired piece of content is a still image, this image is displayed in an enlarged manner in the view area as shown in FIG. 9. If the desired content is a moving image, this image is displayed in the view area. If the desired piece of content is a voice, it is reproduced and output from the speaker 65.

Thus, the user can browse desired pieces of content.

Further, the user can select, in the browsing screen, an application program which can use reproduced content and start the selected program.

While the selected piece of content is being reproduced, the control area of the browsing screen displays the icons of the application programs (the icons of application programs A, B, and C) which can use the selected piece of content, instead of display form icons and sort icons, as shown in FIG. 9.

After rotating the jog dial 4 to activate the display of the icon of a desired application program, the user presses the jog dial 4, starting that application program. After rotating the job dial 4 to put all icons in the inactive state (this state of the control area is referred to as an application unselected state), the user presses the jog dial 4 to stop the activated application program.

If a piece of content has been reproduced, the control area enters the application deselected state as default. The icons shown in FIG. 9 which are shaded are inactive icons.

Thus, by operating the jog dial 4, the user can browse content on the browsing screen, view or listen a desired piece of content found as a result of the browsing, and start an application program which can use the that content.

It should be noted that the above-mentioned forming of a browsing screen corresponding to the operations on the jog dial 4 is implemented by executing the content browsing program 54D) by the CPU 51. For example, in displaying thumbnail icons, the CPU 51 (the content browsing program 54D reads the content names, attributes, sizes, and recording dates from the Memory Stick 116 loaded in the Memory Stick slot 115 via the host bus 52, the bridge 53, the PCI bus 56, and the Memory Stick slot interface 114. Then, the content browsing program 54D generates the thumbnail icons corresponding to the content stored in the Memory Stick 116 and outputs the generated thumbnail icons to the LCD 7 along with the read information (content names, attributes, etc.) via the host bus 52, the bridge 53, and AGP 50, and the video controller 57.

Figure 10:
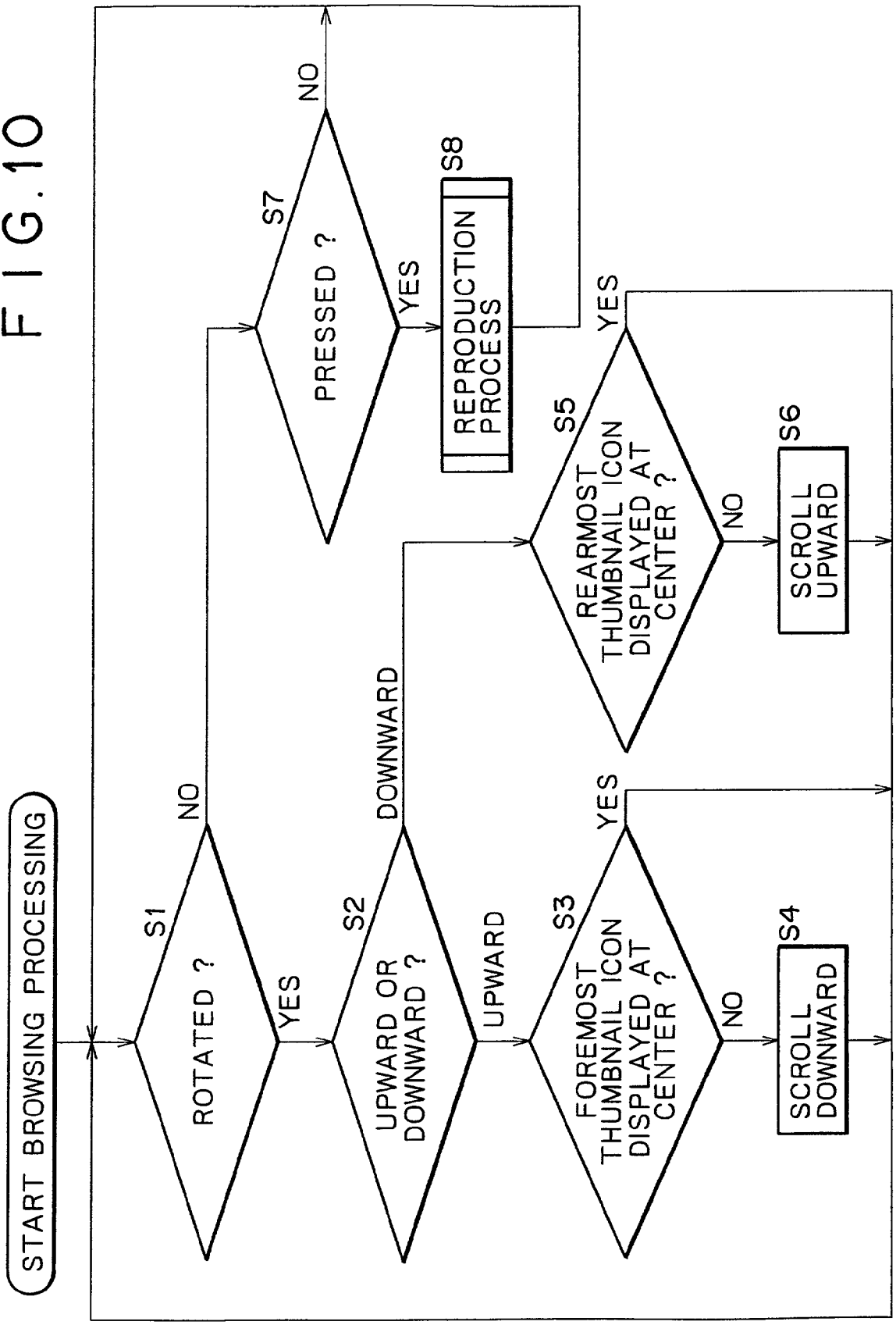
FIG. 10 is a flowchart describing the processing procedure of the content browsing program 54D to be executed when contents are browsed in line view.

The following describes a processing procedure of the content browsing program 54D to be executed when browsing content in the line view, with reference to the flowchart shown in FIG. 10. It should be noted that this processing will start with the browsing screen shown in FIG. 6 displayed on the LCD 7.

In step S1, the content browsing program 54D determines on the basis of a monitor result supplied from the jog dial status monitor program 70F (a program stored in the ROM 70) whether the jog dial 4 has been rotated (up or down as indicated by an arrow "a" shown in FIG. 3). If the jog dial 4 is found rotated, the procedure goes to step S2.

It should be noted that the rotation of the jog dial 4 determined in step S1 is executed when the user wants to scroll the thumbnail icons displayed in the view area of the browsing screen. Namely, steps S2 through S6 to be described below are the processes to be executed for content browsing when the jog dial 4 is rotated.

In step S2, the content browsing program 54D determines whether the jog dial 4 has been rotated up or down. If the jog dial 4 is found rotated up, the procedure goes to step S3. Namely, steps S3 and S4 are the processes to be executed if the jog dial 4 has been rotated up.

In step S3, the content browsing program 54D determines whether the foremost thumbnail icon of those linearly aligned (in the example of FIG. 7, the thumbnail icon of content "name1") is displayed as a selected thumbnail icon (displayed at the center of the view area). If the foremost thumbnail icon is found not displayed as a selected thumbnail icon, the procedure goes to step S4.

In step S4, the content browsing program 54D scrolls all displayed thumbnail icons down by an amount equivalent to the rotational angle of the jog dial 4, for example.

If, in step S3, the foremost thumbnail icon is found displayed as a selected thumbnail icon, then the procedure returns to step S1 by skipping the process of step S4.

Namely, rotating the jog dial 4 up allows to scroll down all displayed thumbnail icons until the foremost thumbnail icon is displayed as a selected icon as shown in FIG. 7.

If, in step S2, the jog dial 4 is found rotated down, the procedure goes to step S5. Namely, the processes of steps S5 and S6 are executed when the jog dial 4 is rotated down.

In step S5, the content browsing program 54D determines whether the rearmost thumbnail icon of those linearly aligned thumbnail icons (in the example of FIG. 8, the thumbnail icon representing content "name15") is displayed as a selected thumbnail icon (displayed at the center of the view area). If the rearmost thumbnail icon is found not displayed as a selected thumbnail icon, then the procedure goes to step S6.

In step S6, the content browsing program 54D scrolls up all displayed thumbnail icons by an amount equivalent to the rotational angle of the jog dial 4 for example. Then the procedure returns to step S1.

If, in step S5, the rearmost thumbnail icon is found as a selected thumbnail icon, then the procedure returns to step S1 by skipping the process of step S6.

Namely, rotating the jog dial 4 down allows to scroll up all displayed thumbnail icons until the rearmost thumbnail icon is displayed as a selected thumbnail icon as shown in FIG. 8.

If, in step S1, the jog dial 4 is found not rotated, then the procedure goes to step S7, in which the content browsing program 54D determines on the basis of a monitor result supplied from the jog dial status monitor program 70F whether the jog dial 4 has been pressed or not. If the jog dial 4 is found pressed, then the procedure goes to step S8. It should be noted that the pressing operation on the jog dial 4 determined in step S7 is executed when the user views the content corresponding to the selected thumbnail icon.

Namely, a content reproducing process is executed in step S8. The content reproduction process will be detailed in the flowchart shown in FIG. 11.

In step S11, the content browsing program 54D determines whether the content represented by the selected thumbnail icon is a still image. If the content is found a still image, then the procedure goes to step S12, displaying that content in an enlarged manner in the view area as shown in the browsing screen of FIG. 9.

At the same time, the content browsing program 54D displays, in the control area, the icons of application programs which can use the still image displayed in an enlarged manner as shown in the browsing screen of FIG. 9. It should be noted that the control area is in the application unselected state as default.

If, in step S11, the content is found not a still image, then the procedure goes to step S13, in which the content browsing program 54D determines whether the content is a moving image or not. If the content is found a moving image, then the procedure goes to step S14.

In step S14, the content browsing program 54D starts a process for reproducing the content represented by the selected thumbnail icon. Consequently, a moving image appears in the view area of the browsing screen.

At the same time, the content browsing program 54D displays, in the control area of the browsing screen, the icons of application programs which can use the moving image to be reproduced.

If, in step S13, the content is found not a moving image, then the procedure goes to step S15, in which the content browsing program 54D determines the content to be a voice and starts a voice reproducing process. Consequently, the voice is outputted from the speaker 65.

At the same time, the content browsing program 54D displays, in the control area of the browsing screen, the icons of application programs which can use the voice to be reproduced.

If the still image was displayed in an enlarged manner in step S12, if the reproduction of the moving image started in step S14, or if the reproduction of the voice started in step S15, and if the icons of applications were displayed in the control area, then the procedure goes to step S16, in which the content browsing program 54D determines on the basis of a monitor result supplied from the jog dial status monitor program 70F whether the jog dial 4 has been rotated or not. The rotation of the jog dial 4 to be determined here is executed to select the icon of an application program displayed in the control area of the browsing screen by activating the display of that icon or stop the activated application program by putting the control area into the application unselected state.

Figure 12:
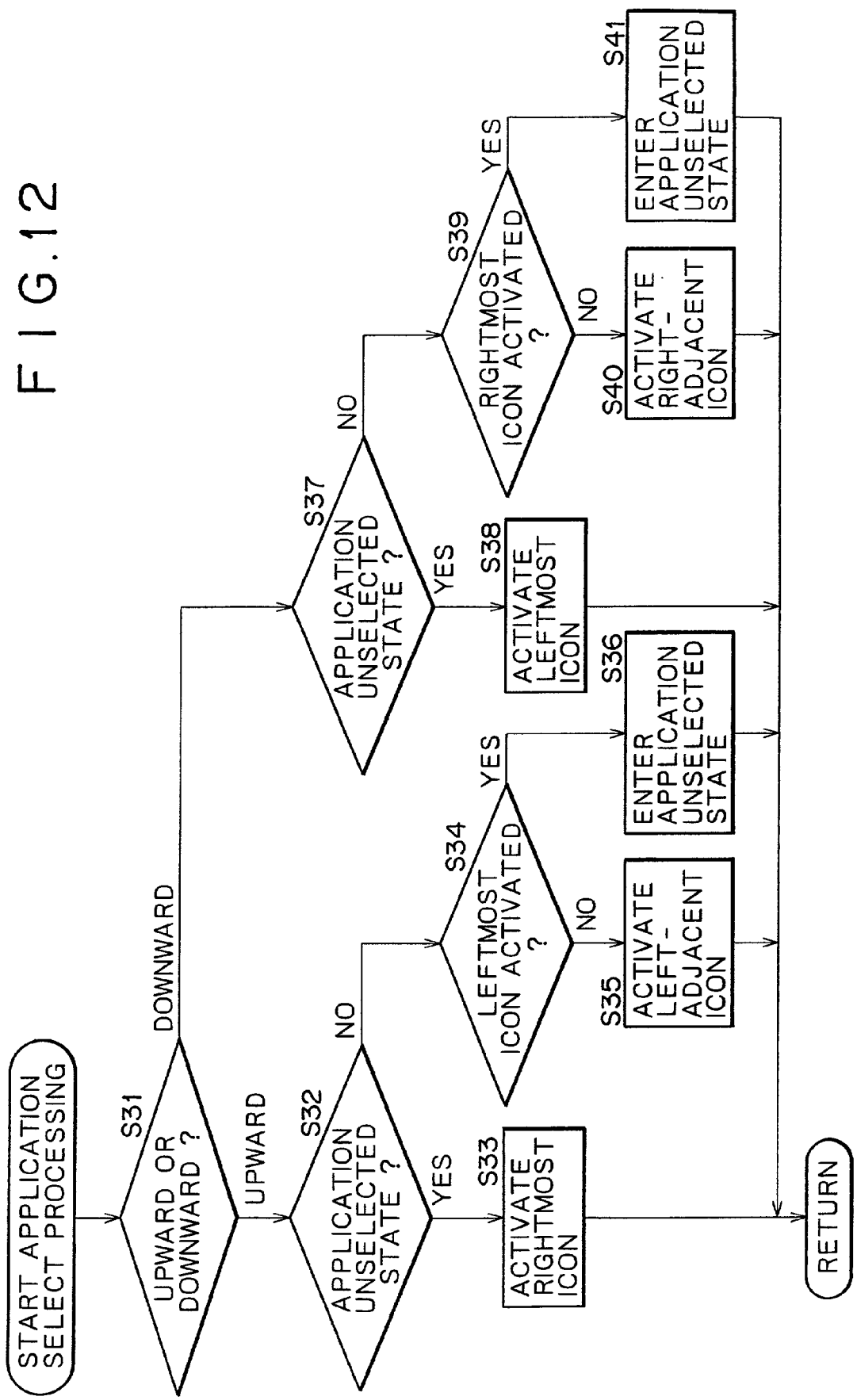
FIG. 12 is a flowchart describing the details of the process of step S17 shown in FIG. 11.

Namely, if, in step S16, the jog dial 4 is found rotated, the procedure goes to step S17 to execute an application program selecting process. This process will be detailed in the flowchart shown in FIG. 12.

Figure 11:
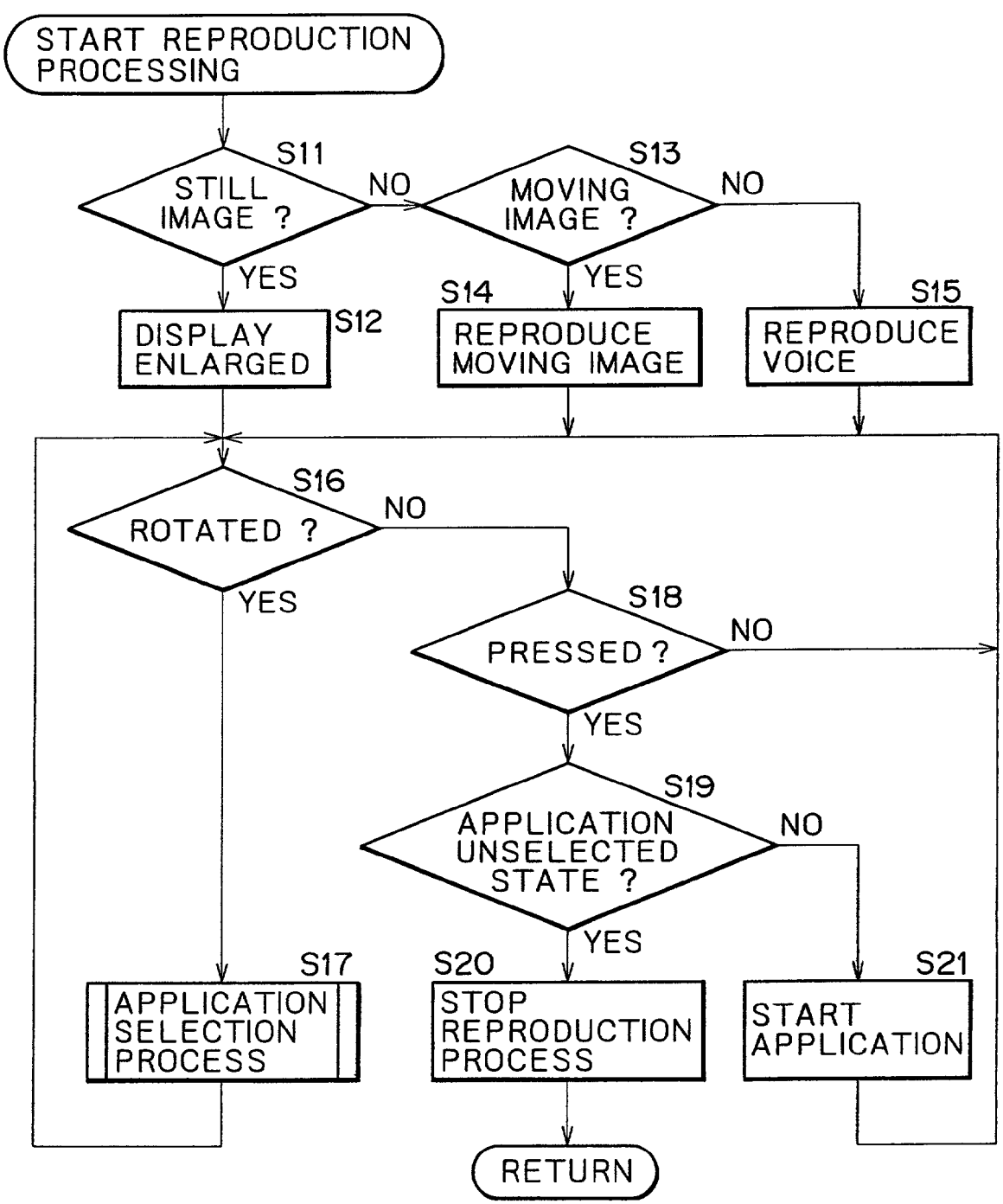
FIG. 11 is a flowchart describing the details of the process of step S8 shown in FIG. 10.

In step S31, the content browsing program 54D determines, on the basis of the rotation detected in step S16 of FIG. 11 whether the jog dial 4 has been rotated upward or downward. If the jog dial 4 is found rotated upward, the procedure goes to step S32.

Namely, the processes of steps S32 through S36 to be described below are executed when the jog dial 4 is rotated upward by the user.

In step S32, the content browsing program 54D determines whether the control area of the browsing screen is in the application unselected state or not. If the control area is found in the application unselected state, then the procedure goes to step S33.

In step S33, the content browsing program 54D activates the icon displayed at the right end of the control area of the browsing screen.

Figure 13A:
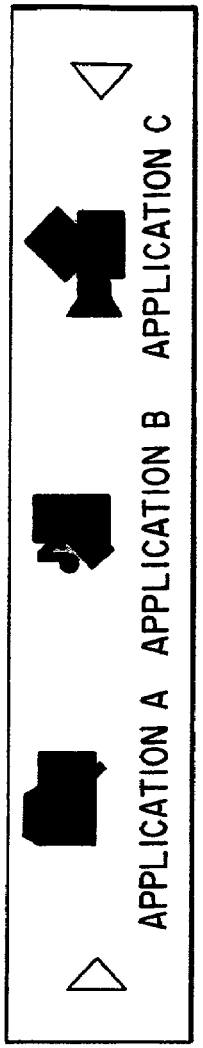
FIGS. 13A through 13D are diagrams illustrating a display example of icons of application programs displayed in the control area of browsing screen.
Figure 13B:
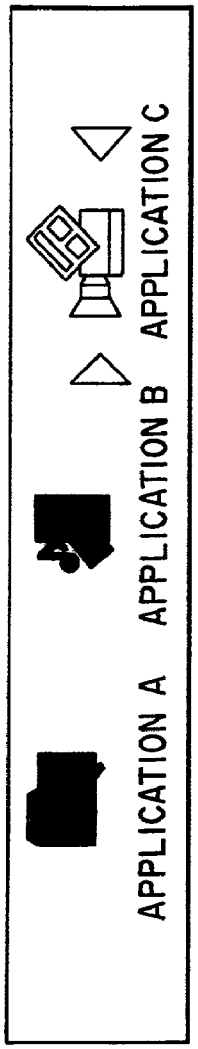

As shown in the control area shown in FIG. 9 or as shown in FIG. 13A, if the job dial 4 is rotated upward with the control area set to the application unselected state, the procedure goes through steps S31 and S32 to step S33, upon which the icon, displayed at the right end, of application program C is activated as shown in FIG. 13B. It should be noted that FIG. 13 shows enlarged control area portions in which the icons of application programs are shown. In FIG. 13, each white icon denotes an active icon, while each shadowed icon denotes a inactive icon.

If, in step S32, the control area is found not in the application unselected state, then the procedure goes to step S34, in which the content browsing program 54D determines whether the icon at the left end in the control area is active or not. If this icon is found not active, then the procedure goes to step S35.

In step S35, the content browsing program 54D activates the icon to the left of the currently activated icon of the application program.

Figure 13C:
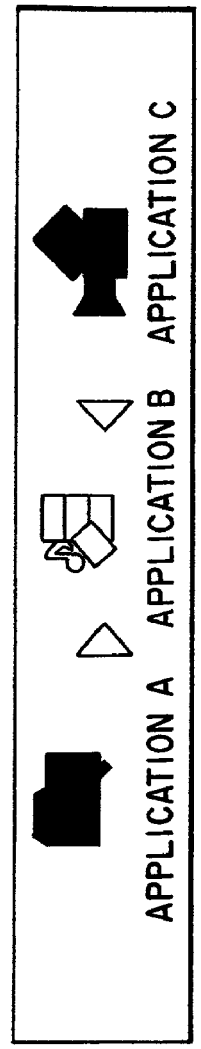

For example, as shown in FIG. 13B, if the icon of the application program C is active (if the leftmost icon of the application program A is not active), rotating the jog dial 4 upward causes the procedure to go through steps S31, S32, and S34 to S35, activating the icon of the application program B displayed to the left of the icon of the application program C as shown in FIG. 13C.

If, in step S34, the leftmost icon is found active, then the procedure goes to step S36, in which the content browsing program 54D puts the control area into the application unselected state.

Figure 13D:
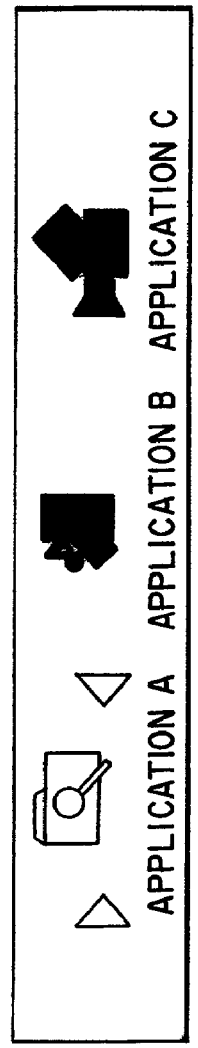

For example, as shown in FIG. 13D, when the icon of the application program A displayed at the left end is active, rotating the jog dial 4 upward causes the procedure to go through steps S31, S32, and S34 to S36, putting (returning) the control area into the application unselected state as shown in FIG. 13A.

If, in step S33, the rightmost icon is activated, if, in step S35, the icon to the left is activated, or if, in step S36, the control area is put in the application unselected state, then, the processing comes to an end, upon which the procedure returns to step S16 of FIG. 11 to repeat the above-mentioned processes.

Namely, in selecting the icon of a particular application program, when the user rotates the jog dial 4 upward, the display of the control area repeatedly changes the states shown in FIGS. 13A, 13B, 13C, and 13D.

If, in step S31, the jog dial 4 is found rotated downward, then the procedure goes to step S37. Namely, the processes of step S37 through S41 are executed when the user rotates the jog dial 4 downward.

In step S37, the content browsing program 54D determines whether the control area of the browsing screen is in the application unselected state or not. If the control area is found in the application unselected state, the procedure goes to step S38.

In step S38, the content browsing program 54D activates the icon displayed at the left end of those icons displayed in the control area of the browsing screen.

As shown in the control area of FIG. 9 or in FIG. 13A, when the jog dial 4 is rotated downward with the control area kept in the application unselected state, the procedure goes through steps S31 and S37 to step S38, activating the icon of the application program A displayed at the left end as shown in FIG. 13D.

If, in step S37, the control area is fount not in the application unselected state, then the procedure goes to step S39, in which the content browsing program 54D determines whether the icon displayed at the right end in the control area is active or not. If, this icon is found not active, then the procedure goes to step S40.

In step S40, the content browsing program 54D activates the icon displayed to the right of the currently activated icon of the application program.

For example, as shown in FIG. 13D, if the jog dial 4 is rotated downward with the icon of the application program A being active (if the icon of the application program C displayed at the right end is not active), the procedure goes through steps S31, S37, and S39 to step S40, activating the icon of the application program B displayed to the right of the above-mentioned icon.

If, in step S39, the icon displayed at the right end is found active, then the procedure goes to step S41, in which the content browsing program 54D puts the control area into the application unselected state.

For example, as shown in FIG. 13B, if the jog dial 4 is rotated downward with the icon of the application program C displayed at the right end being active, the procedure goes through steps S31, S37, and S39 to step S41, putting (returning) the control area into the application unselected state as shown in FIG. 13A.

If, in step S38, the icon at the left end is activated, if, in step S40, the icon to the right is activated, or, if, in step S41, the control area is put in the application unselected state, the processing comes to an end, upon which the procedure returns to step S16 to repeat the above-mentioned processes.

Namely, if, in selecting the icon of a particular application program, the user rotates the jog dial 4 downward, the display of the control area repeatedly changes the states of FIGS. 13A, 13D, 13C, and 13B.

Next, if, in step S16 of FIG. 11, the jog dial 4 is found not rotated, then the procedure goes to step S18, in which the content browsing program 54D determines on the basis of a monitor result supplied from the jog dial status monitor program 70F whether the jog dial 4 has been pressed or not. If the jog dial 4 is found pressed, then the procedure goes to step S19.

In step S19, the content browsing program 54D determines whether the control area of the browsing screen is in the application unselected state or not. If the control area is found in the application unselected state, then the procedure goes to step S20, thereby stopping the content reproduction processing started in step S12, S14, or S15. Consequently, the content reproduction processing is stopped, upon which the browsing screen returns to the state shown in FIGS. 6 through 8 for example. Then, the processing comes to an end and the procedure returns to step S1 shown in FIG. 10.

If, in step S19, the control area is found not in the application unselected state, then the procedure goes to step S21, in which the content browsing program 54D starts the application program represented by the icon which is active in the control area of the browsing screen. Then, the procedure returns to step S16 to repeat the above-mentioned processes.

If, in step S18, the jog dial 4 is found not pressed, then the procedure returns to step S16. Namely, because the procedure does not go to step S20 or S21, the content reproduction processing continues.

The following describes the processing of browsing contents in the circle view.

In the view area of the browsing screen in the case of the circle view, the thumbnail icons representing the contents stored in the Memory Stick 116 are aligned in a curve constituting a circle as shown in FIG. 14. The sequence of the alignment of these thumbnail icons follows the sequence of sort icons in the control area. In the example shown in FIG. 14, the thumbnail icons are aligned in the sequence of names of corresponding content items.

In the alignment of these thumbnail icons, one of them is always displayed as a selected icon at the center of the view area.

The selected thumbnail icon is displayed in its entirety as with the case of the line view, the corresponding content name (NAME9), attribute (JPG and an image of a camera), storage size (96K), and recording date (20 Apr. 1999) being displayed below the icon, the icon and these pieces of information being framed.

The thumbnail icons other than the selected icon are displayed overlapped each other. The content names and attributes of these icons are displayed below them in a corresponding manner.

Namely, the user can browse the entire image of the selected thumbnail icon and its content name, attribute, storage size, and recording date and the parts of the other thumbnail icons and their content names and attributes.

By rotating the jog dial 4, the user can scroll all icons displayed in the view area. When the jog dial 4 is rotated upward, all thumbnail icons are scrolled clockwise by an amount equivalent to the rotational angle for example. Namely, all thumbnail icons move clockwise, the thumbnail icon in the upper left disappearing from the view area and a new icon appearing into the upper right.

The view area of the browsing screen shown in FIG. 15 displays a state in which the view area has been scrolled by an amount equivalent to one thumbnail icon relative to the displayed view area of the browsing screen shown in FIG. 14.

On the other hand, when the jog dial 4 is rotated downward, all thumbnail icons are scrolled counterclockwise by an amount equivalent to the rotational angle for example. Namely, all displayed thumbnail icons move counterclockwise, the thumbnail icon displayed in the upper right disappearing and a new icon appears into the upper left of the view area.

Thus, the user can browse all content items stored in the Memory Stick 116.

In addition, the user can view any desired piece of contents when it has been found as a result of browsing. The operations to be executed for the finding and viewing are the same as those for the line view and therefore need not be described.

Further, the user can select an application program which uses the content to be reproduced and start the selected application program. The operations to be executed for the selection and starting are the same as those for the line view and therefore need not be described.

Thus, by operating the jog dial 4, the user can browse contents, view contents found as a result of viewing, and start an application program which can use the contents.

The following describes the processing procedure of the content browsing program 54D for browsing contents in the circle view, with reference to the flowchart shown in FIG. 16. It should be noted that this processing starts with the browsing screen shown in FIG. 15 displayed on the LCD 7.

In step S51, the content browsing program 54D determines on the basis of a monitor result supplied from the jog dial status monitor program 70F whether the jog dial 4 has been rotated or not. If the jog dial 4 is found rotated, the procedure goes to step S52.

It should be noted that the rotation of the jog dial 4 determined in step S51 is executed when the user wants to scroll the thumbnail icons displayed in the view area of the browsing screen. Namely, the steps S52 through S54 are executed when the user browse contents by rotating the jog dial 4.

In step S52, the content browsing program 54D determines whether the jog dial 4 has been rotated upward or downward. If the jog dial 4 is found rotated upward, the procedure goes to step S53.

In step S53, the content browsing program 54D scrolls all thumbnail icons clockwise by an amount equivalent to the rotational angle of the jog dial 4 for example, upon which the procedure returns to step S51.

If, in step S52, the jog dial 4 is found rotated downward, then the procedure goes to step S54. In step S54, the content browsing program 54D scrolls all thumbnail icons counterclockwise by an amount equivalent to the rotational angle of the jog dial 4, upon which the procedure returns to step S51.

If, in step S51, the jog dial 4 is found not rotated, then the procedure goes to step S55, in which the content browsing program 54D determines on the basis of a monitor result supplied from the jog dial status monitor program 70F whether the jog dial 4 has been pressed or not. If the jog dial 4 is found pressed, the procedure goes to step S56. It should be noted that the pressing of the jog dial 4 determined in step S55 is executed by the user to view the content represented by the selected icon.

The process of step S56 is the same as the process of S8 shown in FIG. 10 (described with reference to the flowcharts shown in FIGS. 11 and 12) and therefore need not be described.

The following describes the processing for browsing contents in the spiral view.

In the view area of the browsing screen in the spiral view, the thumbnail icons representing the content items stored in the Memory Stick 116 are displayed as aligned along a spiral in a three-dimensional manner as shown in FIG. 17. Of the thumbnail icons aligned in a spiral manner, those in the inner part with respect to the screen are shown smaller, while those in this side are shown larger. The sequence of the thumbnail icon alignment follows the sequence of the sort icons displayed in the control area. In FIG. 17, the thumbnail icons are aligned in the sequence of corresponding content names.

In this thumbnail alignment, one thumbnail image is always displayed at the center of the view area as a selected icon.

As with the line view, the selected thumbnail icon is displayed in its entirety, the corresponding content name (name9), attribute (JPG and an image of a camera), storage size (96K), and recording date (4 Apr. 1999) being displayed below the image and these information items being framed.

The thumbnail icons other than the selected thumbnail icon are displayed overlapped each other.

Namely, the user can browse the entire thumbnail image of the selected thumbnail icon and its content name, attribute, size, and recording date and the parts of the thumbnail images of the other thumbnail icons.

In addition, the user can scroll the thumbnail icons displayed in the view area of the browsing screen in the FIG. 18 by rotating the jog dial 4. When the jog dial 4 is rotated upward, all thumbnail icons are scrolled down rotating to the right by an amount equivalent to the rotational angle for example. Namely, the thumbnail icon displayed in the bottom of the view area disappears while a new thumbnail icon appears from top of the view area.

The view area of the browsing screen shown in FIG. 18 displays the foremost thumbnail icon as a selected thumbnail icon as a result of rotating the jog dial 4 upward to scroll all thumbnail icons down rotating to the right. It should be note that, if the jog dial 4 is rotated further upward in this state, the thumbnail icons will not be scrolled further down.

On the other hand, when the jog dial 4 is rotated downward, all thumbnail icons are scrolled up rotating to the left by an amount equivalent to the rotational angle for example. Namely, the thumbnail icon displayed in the top of the view area disappears while a new thumbnail icons appears from the bottom of the view area.

Figure 19:
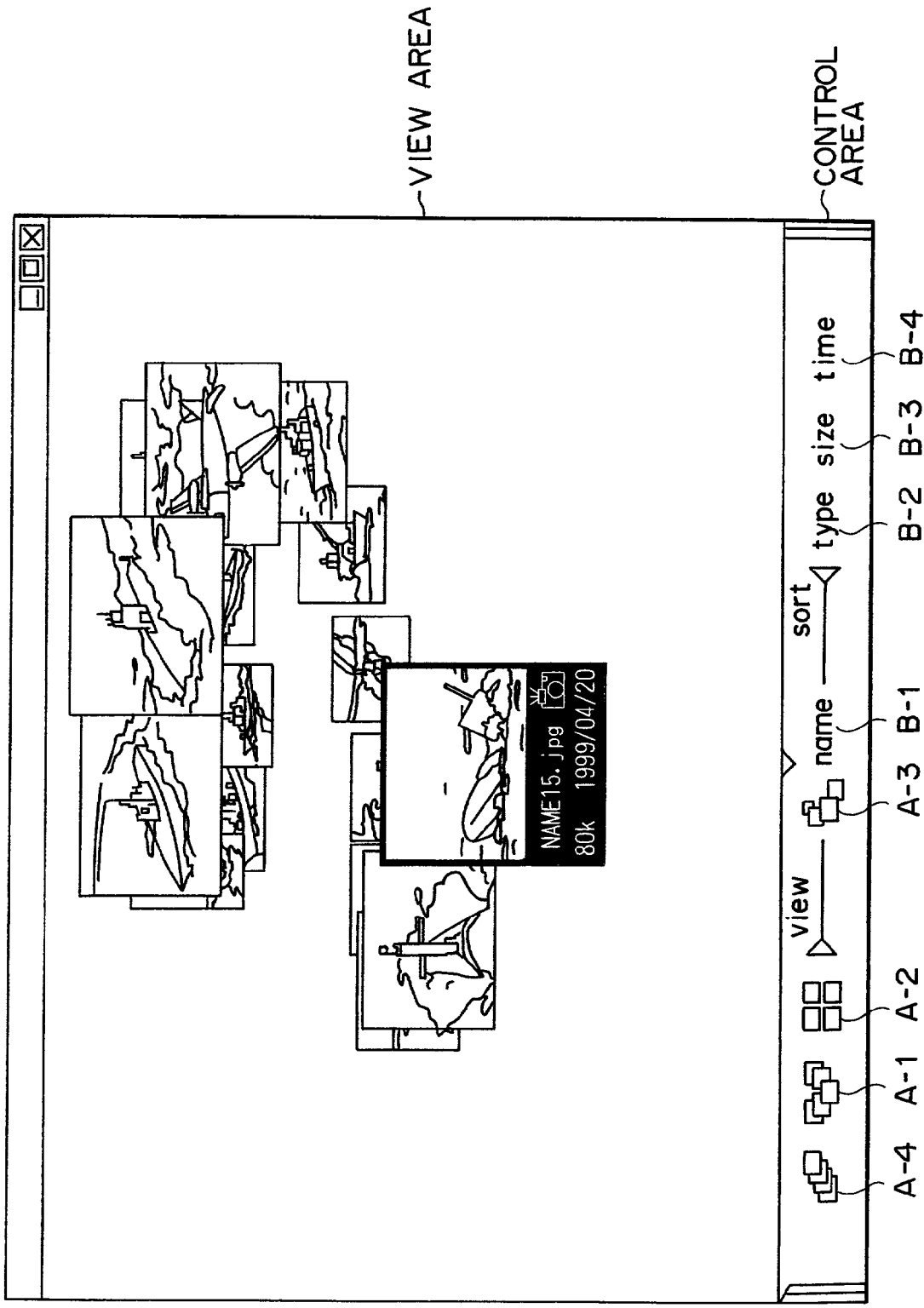
FIG. 19 is a diagram illustrating a still different display example of browsing screen.

In the view area of the browsing screen shown in FIG. 19, the rearmost thumbnail icon in the thumbnail icon alignment is displayed as a selected thumbnail icon as a result of rotating the jog dial 4 downward to cause the thumbnail icons scroll up rotating to the left. It should be noted that, if the jog dial 4 is rotated further downward in this state, the thumbnail icons will not be scrolled further up.

Thus, the user can browse all content items stored in the Memory Stick 116.

In addition, when a desired item of contents is found as a result of browsing, the user can view the content represented by that thumbnail icon. The operations to be executed for the viewing are the same as those of the line view and there need not be described.

Further, the user can select an application program which uses the content to be reproduced and start the selected application program. The operations to be executed for the selection and starting are the same as those of the line view and therefore need not be described.

Thus, the user can browse contents, view a desired content item found as the result of the browsing, and start an application program which uses the contents by operating the jog dial 4.

Figure 20:
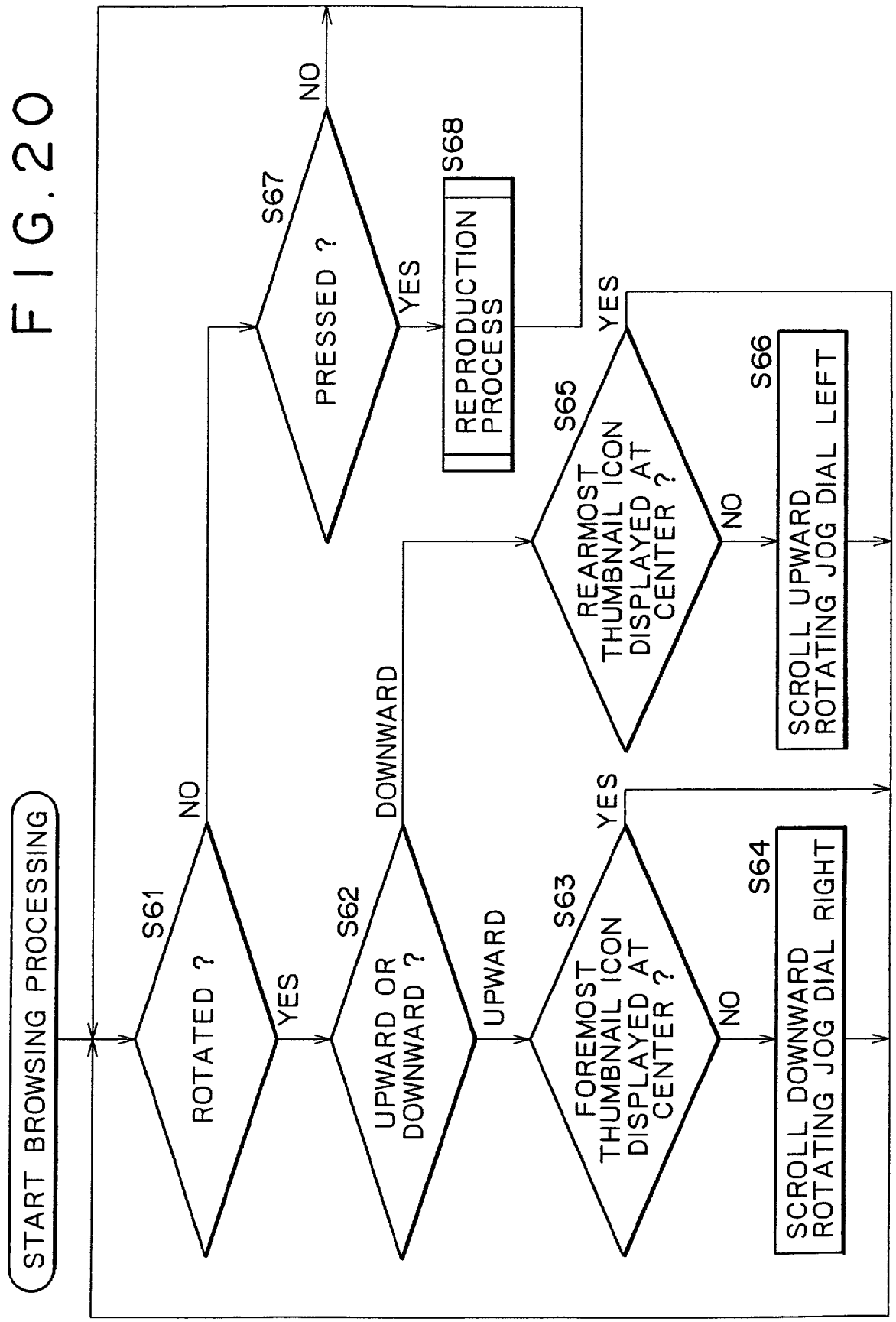
FIG. 20 is a flowchart describing the processing procedure of the content browsing program 54D to be executed to browse contents in spiral view.

The following describes the processing procedure of the content browsing program 54D for browsing contents in the spiral view, with reference to the flowchart shown in FIG. 20.

Steps S61 through S68 are basically the same as steps S1 through S8 shown in FIG. 10 as with the line view and therefore need not be described in detail. In step S64, all thumbnail icons are scrolled down rotating to the right. In step S66, the thumbnail icons are scrolled up rotating to the left.

The following describes the processing of viewing contents in the planar view.

In the view area of the browsing screen in the case of the planar view, the thumbnail icons representing content items stored in the Memory Stick 116 are displayed in a planar (horizontal and vertical) alignment as shown in FIG. 21. The sequence of the thumbnail icon alignment follows the sequence of sort icons in the control area. In the example shown in FIG. 21, the thumbnail icons are aligned in the sequence of corresponding content names.

In this thumbnail icon alignment, one thumbnail icon is always displayed at the center of the view area as an selected icon.

As with the line view, the selected thumbnail icon is displayed in its entirety, its content name (name8), attribute (JPG and camera image), storage size (46K), and recording date (4 Apr. 1999) being displayed below the thumbnail icon and these information pieces and the thumbnail icon being framed.

The thumbnail icons other than the selected thumbnail icon are displayed so that their thumbnail images are all visible. Below these thumbnail icons, the corresponding content names and attributes are displayed.

Namely, the user can browse the entire selected thumbnail icon and its content name, attribute, size, and recording date and the other thumbnail icons in their entirety and their content names and attributes.

In addition, the rotating the jog dial 4, the user can scroll the thumbnail icons displayed in the view area. When the jog dial 4 is rotated upward, all thumbnail icons are scrolled to the right by an amount equivalent to the rotational angle for example. Namely, the thumbnail icons move to the right.

Figure 22:
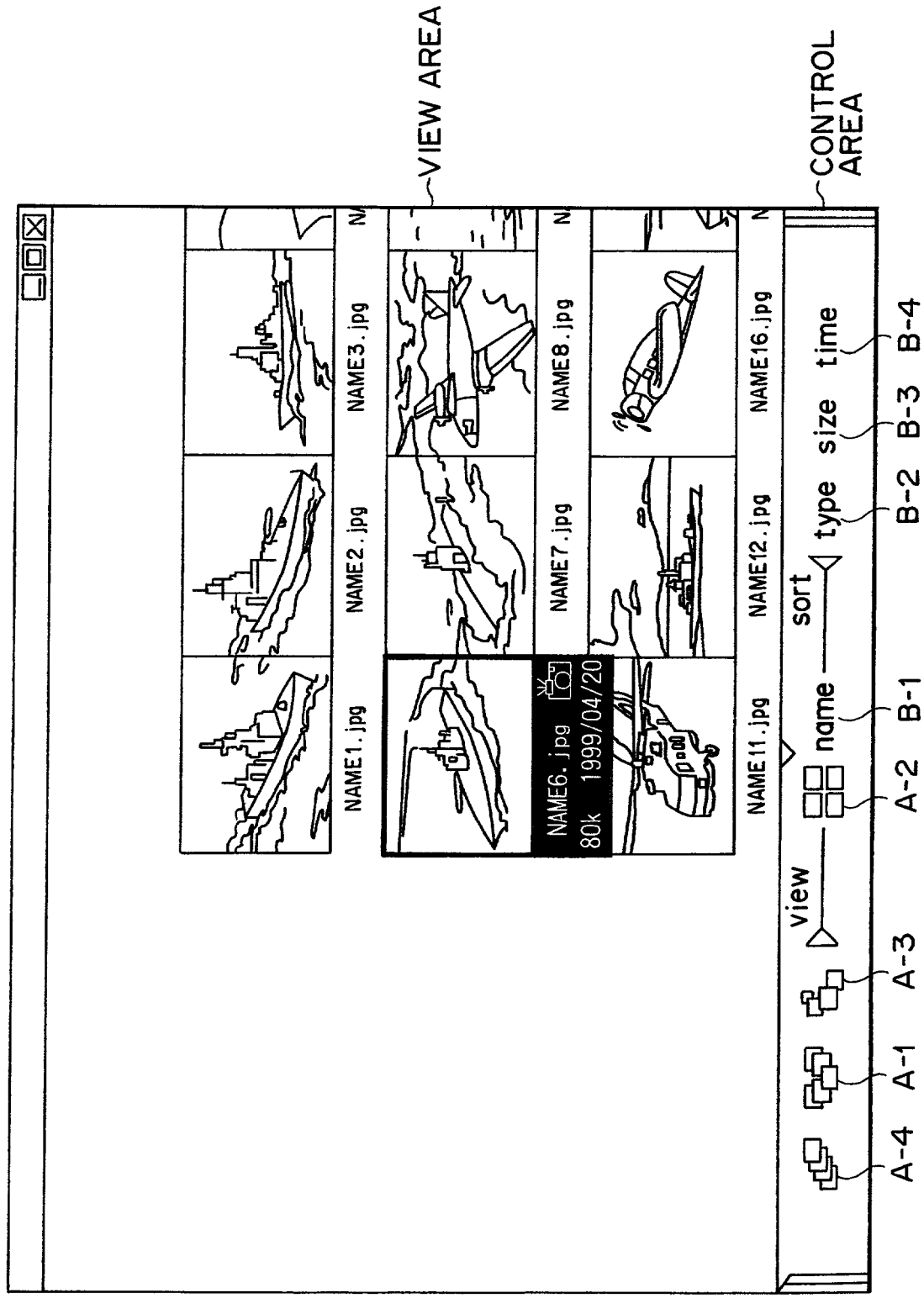
FIG. 22 is a diagram illustrating still another display example of browsing screen.

In the view area of the browsing screen shown in FIG. 22, the thumbnail icon of the content "NAME6" at the left end is displayed as a selected icon of the thumbnail icons aligned in a planar manner as a result of rotating the jog dial upward to scroll all thumbnail icons to the right.

Figure 23:
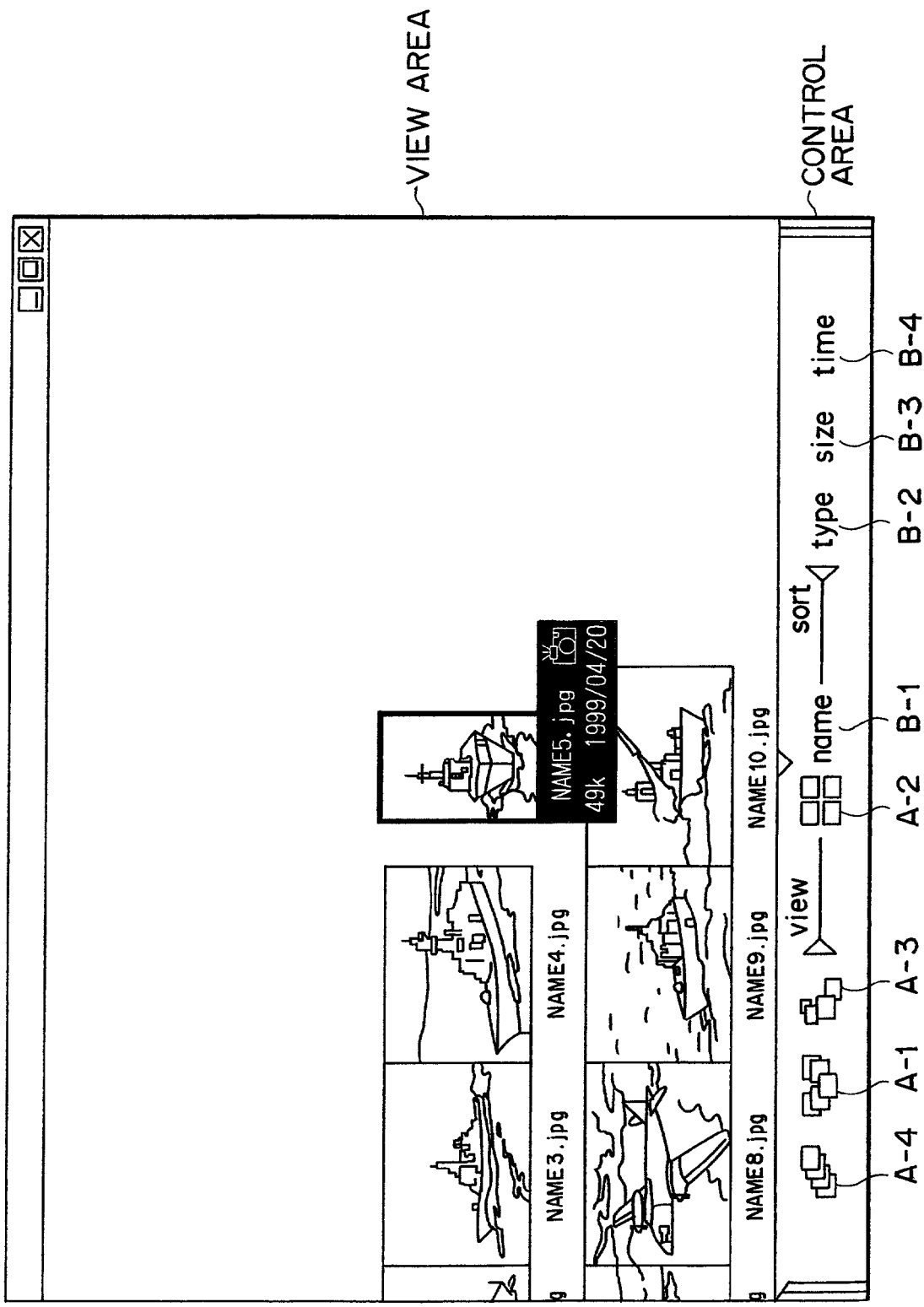
FIG. 23 is a diagram illustrating yet another display example of browsing screen.

If the jog dial 4 is rotated further upward in this state, all thumbnail icons are widely scrolled to the lower left. Consequently, as shown in FIG. 23, the thumbnail icon of the content "NAME5" at the upper of the row of the thumbnail icon of the content "NAME6" displayed as a selected thumbnail icon in FIG. 22 and at the right end is displayed as a selected thumbnail icon.

When the jog dial 4 is rotated further upward in this state, all thumbnail icons are scrolled to the right.

Figure 24:
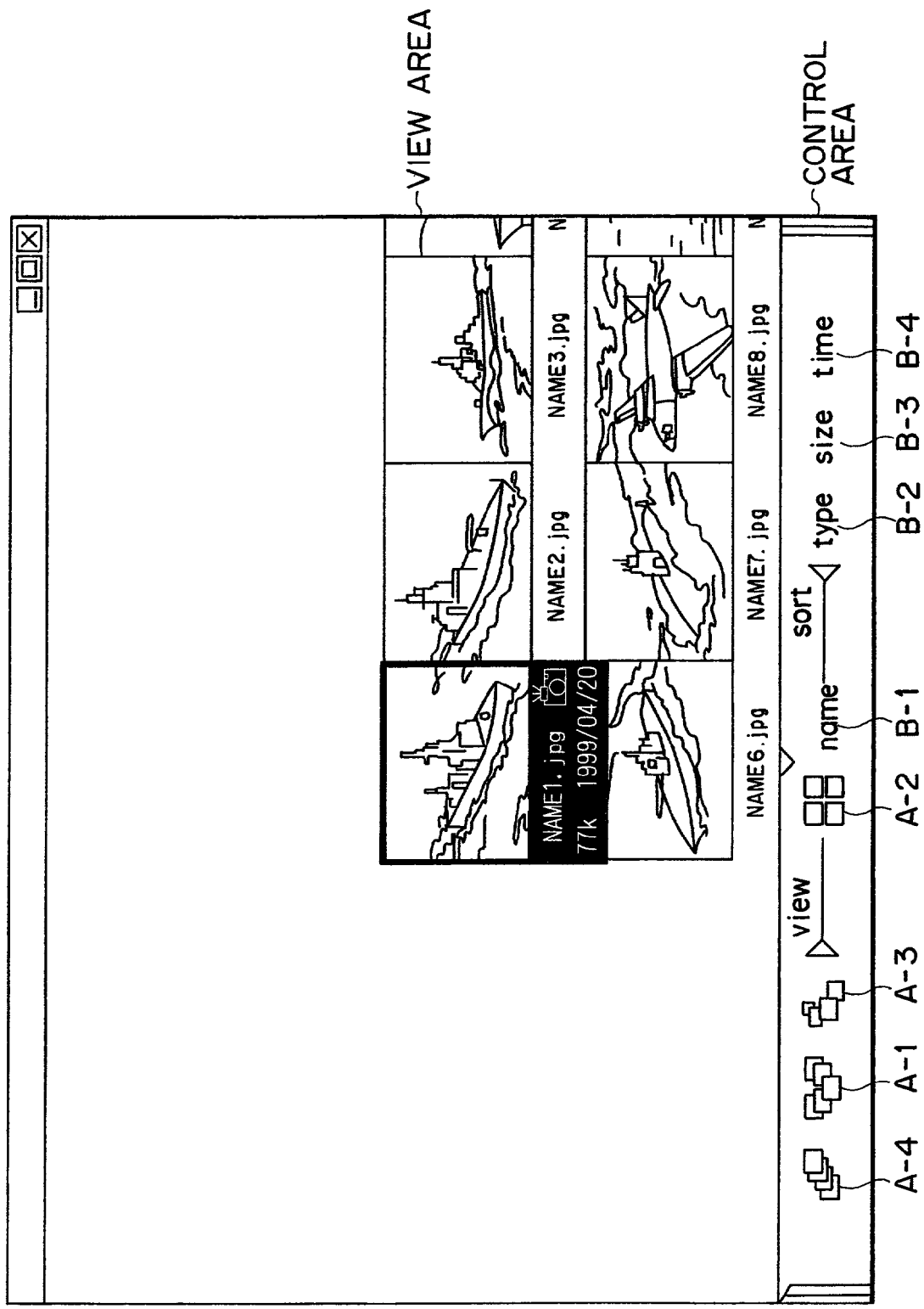
FIG. 24 is a diagram illustrating a different display example of browsing screen.

In the view area of the browsing screen of FIG. 24, the thumbnail icon of the content "NAME1" at the upper left corner of the thumbnail icons aligned in a planar manner is displayed as a selected icon as a result of rotating the jog dial 4 further upward to scroll all thumbnail icons to the right. It should be noted that, if the jog dial 4 is rotated further upward, the thumbnail icons will not be scrolled any further.

On the other hand, if the jog dial 4 is rotated downward, all thumbnail icons are scrolled to the left by an amount equivalent to the rotational angle for example. Namely, the displayed thumbnail icons move to the left.

Figure 25:
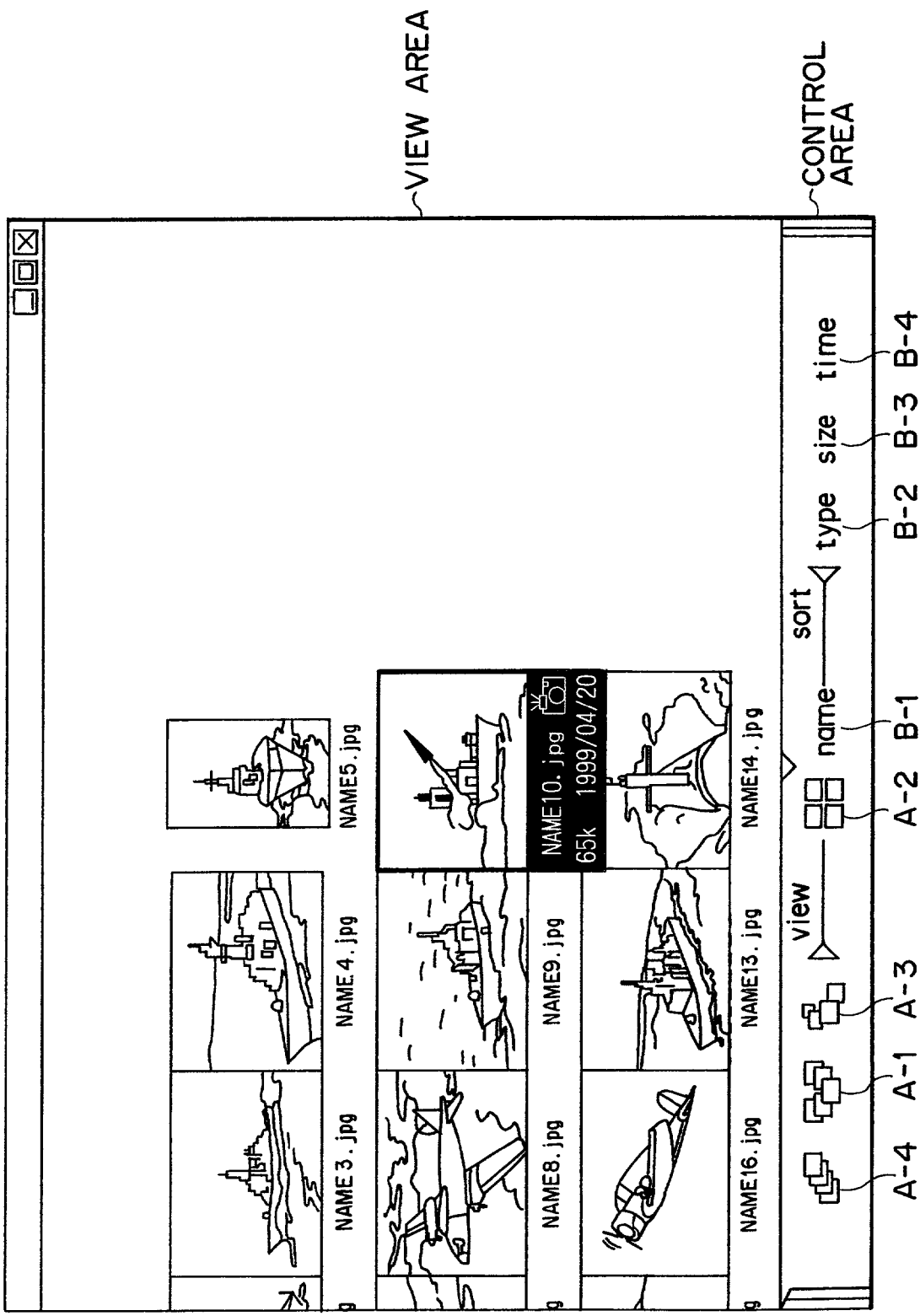
FIG. 25 is a diagram illustrating a still different display example of browsing screen.

In the view area of the browsing screen of FIG. 25, the thumbnail icon of the content "NAME10" at the right end is displayed as a selected thumbnail icon as a result of rotating the jog dial 4 downward to scroll all thumbnail icons to the left.

Figure 26:
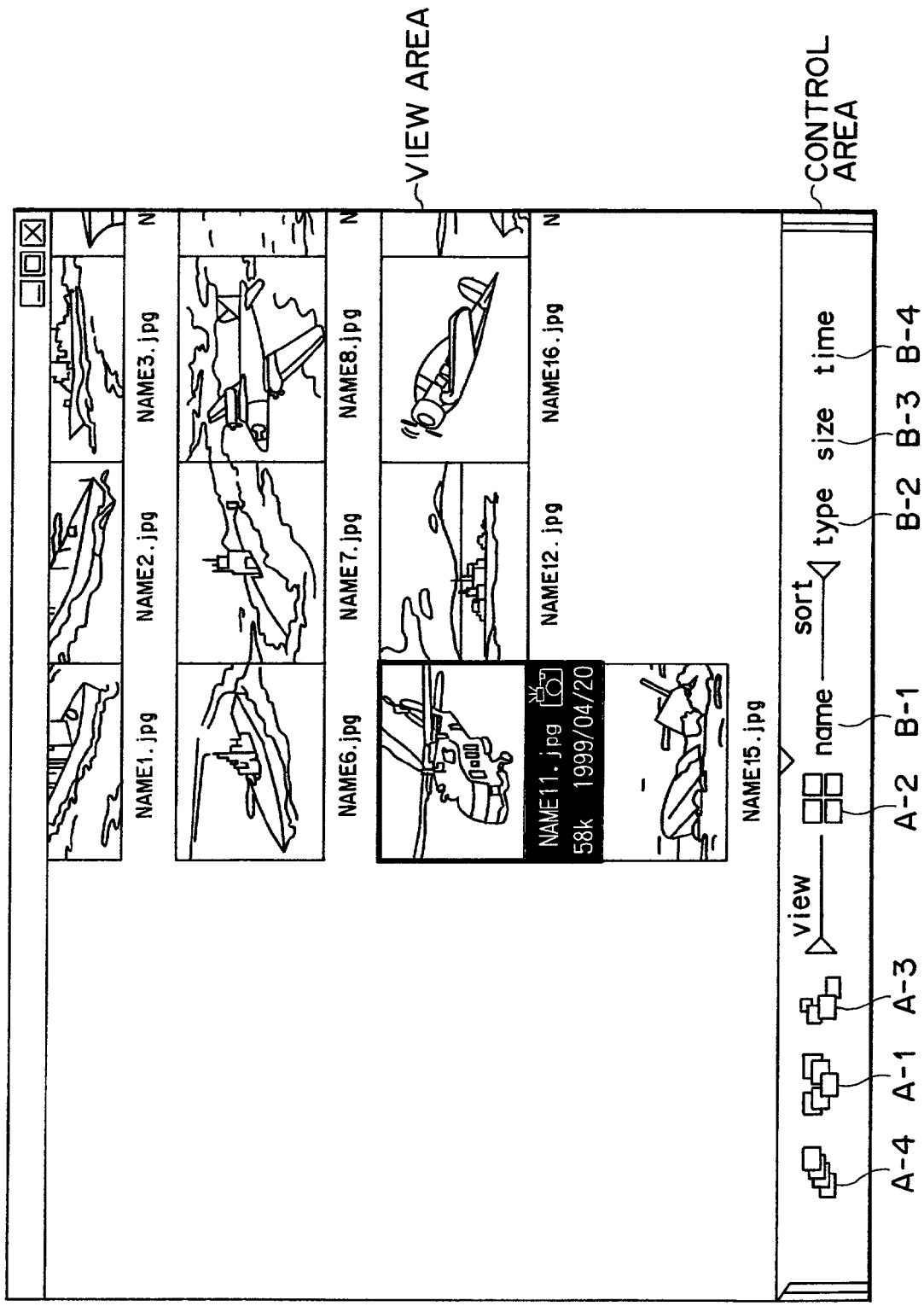
FIG. 26 is a diagram illustrating a yet different display example of browsing screen.

If the jog dial 4 is rotated further downward in this state, all thumbnail icons are widely scrolled to the upper right. Consequently, as shown in FIG. 26, the thumbnail icon of the content "NAME11" below the row including the thumbnail icon of the content "NAME10" displayed as a selected thumbnail icon shown in FIG. 25 and at the left end is displayed as a selected thumbnail icon.

If the jog dial 4 is rotated further downward in this state, all thumbnail icons are scrolled to the left again.

Figure 27:
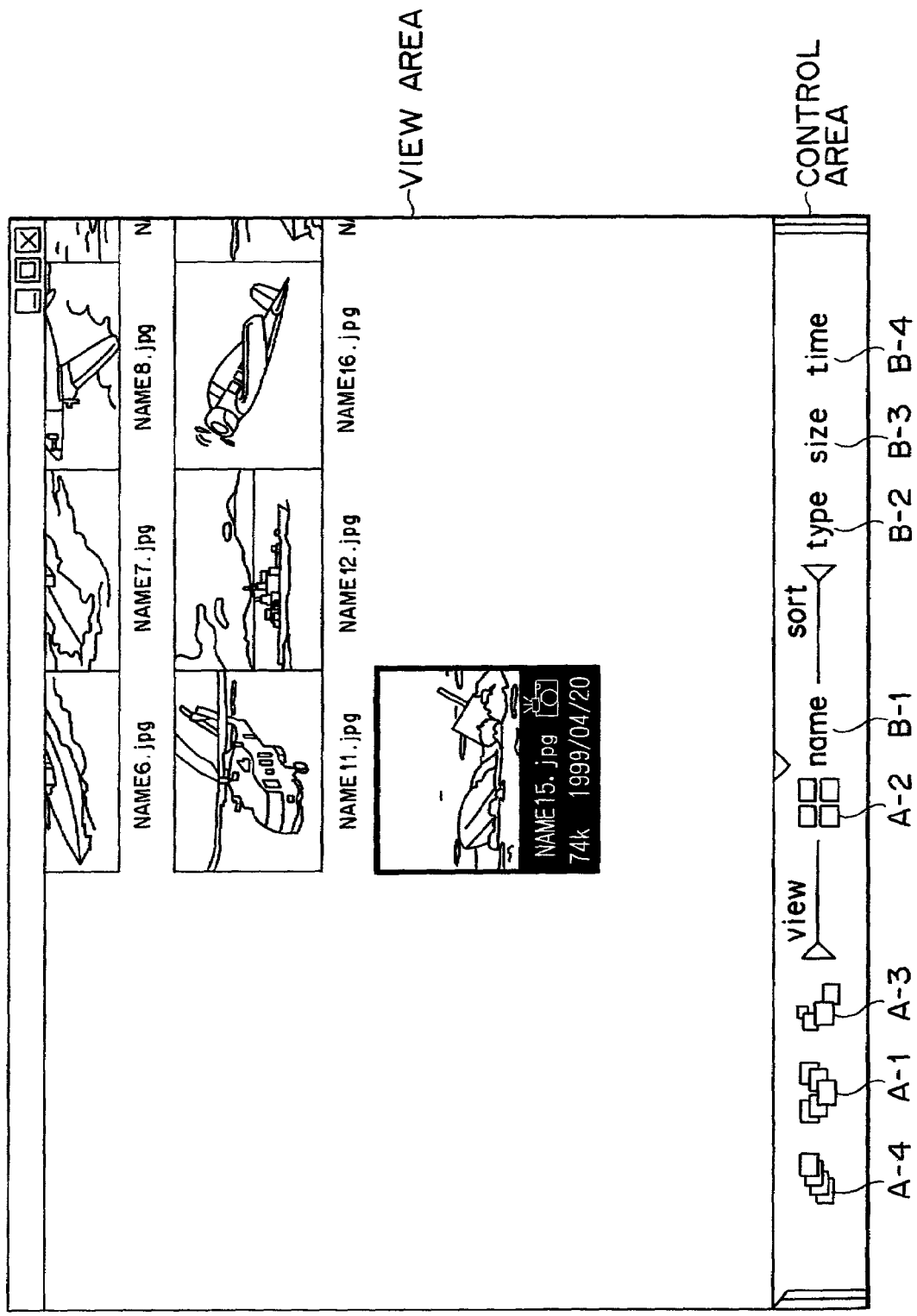
FIG. 27 is a diagram illustrating another display example of browsing screen.

In the view area of the browsing screen of FIG. 27, the thumbnail icon at the lower left corner of the thumbnail icons aligned in a planar manner is displayed as a selected thumbnail icon as a result of rotating the jog dial 4 further downward to scroll all thumbnail icons further to the left or to the right. It should be noted that, if the jog dial 4 is rotated further upward, the thumbnail icons will not be scrolled any further.

Thus, the user can browse all content items stored in the Memory Stick 116 for example.

In addition, when a desired item of contents is found as a result of browsing, the user can reproduce the content represented by that thumbnail icon. The operations to be executed for the viewing are the same as those of the line view and there need not be described.

Further, the user can select an application program which uses the content to be reproduced and start the selected application program. The operations to be executed for the selection and starting are the same as those of the line view and therefore need not be described.

Figure 28:
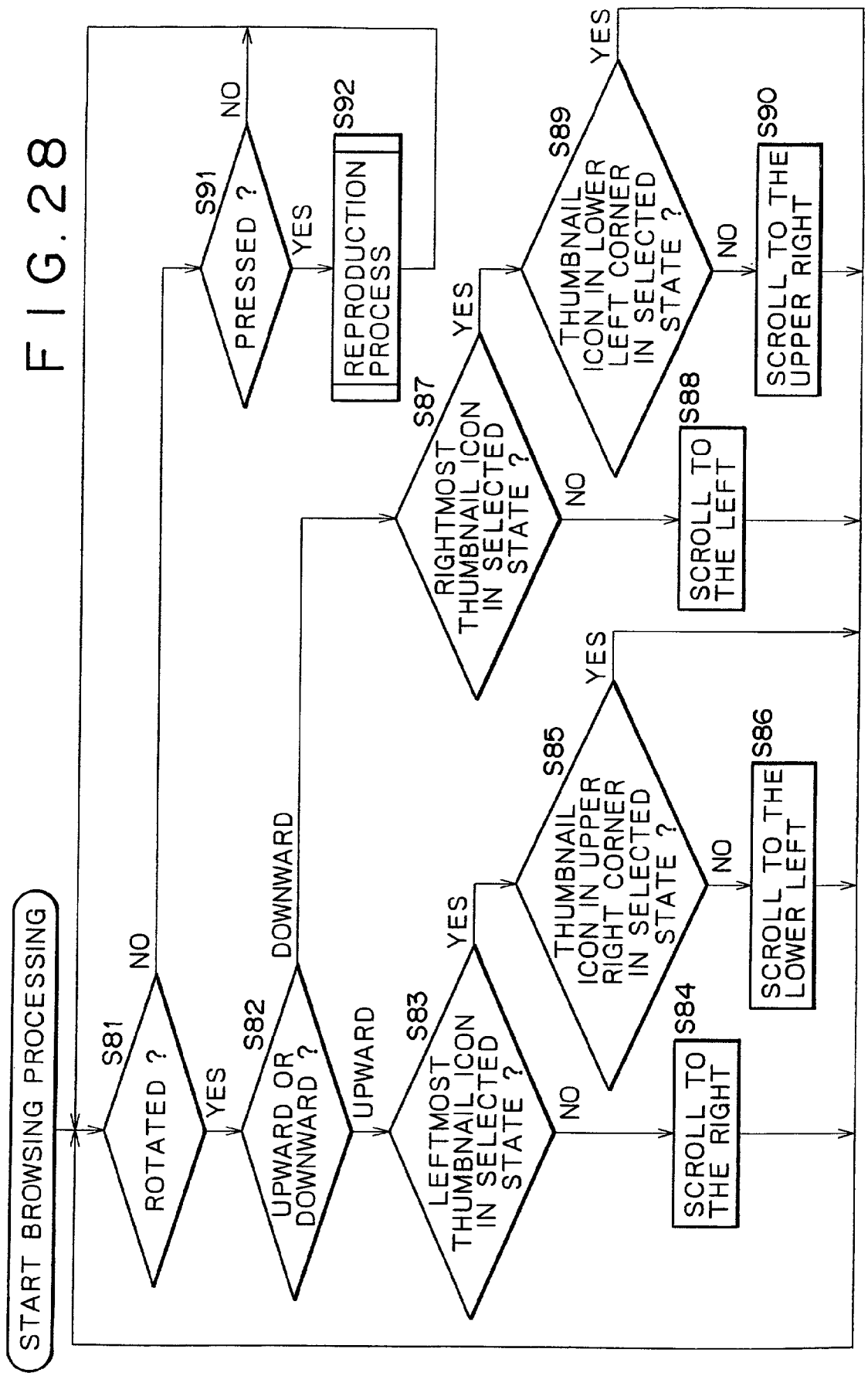
FIG. 28 is a flowchart describing the processing procedure of the content browsing program 54D to be executed to browse contents in planar view.

The following describes the processing procedure of the content browsing program 54D to be executed when content is browsed in the planar view, with reference to the flowchart shown in FIG. 28. It is assumed here that the browsing screen shown in FIG. 21 is already displayed on the LCD 7.

In step S81, the content browsing program 54D determines on the basis of a monitor result supplied from the jog dial status monitor program 70F whether the jog dial 4 has been rotated or not. If the jog dial 4 is found rotated, then the procedure goes to step S82.

It should be noted that the rotation of the jog dial 4 determined in step S81 is executed by the user to scroll the thumbnail icons displayed in the view area of the browsing screen. Namely, steps S82 through S90 to be described below are executed when the user rotates the jog dial 4 to browse contents. Steps S83 through S86 are executed when the jog dial 4 is rotated upward and steps S87 through S90 are executed when the jog dial 4 is rotated downward.

In step S82, the content browsing program 54D determines whether the jog dial 4 has been rotated upward or downward. If the jog dial 4 is found rotated upward, then the procedure goes to step S83.

In step S83, the content browsing program 54D determines whether the thumbnail icon at the left end of the icons aligned in a planar manner is displayed as a selected thumbnail icon (displayed at the center of the view area). If the this thumbnail icon is found not displayed as a selected icon, the procedure goes to step S84.

In step S84, the content browsing program 54D scrolls all thumbnail icons to the right by an amount equivalent to the rotational angle of the jog dial 4 for example, upon which the procedure returns to step S81.

If, in step S83, the thumbnail icon at the left end is found displayed as a selected thumbnail icon, then the procedure goes to step S85 to determine whether the thumbnail icon at the upper right corner is displayed as a selected thumbnail icon. If this thumbnail icon is found not displayed as a selected thumbnail icon, the procedure goes to step S86.

In step S86, the content browsing program 54D widely scrolls all thumbnail icons to the lower left, upon which the procedure returns to step S81.

If, in step S85, the thumbnail icon at the upper left corner is found displayed as a selected thumbnail icon, then the procedure returns to step S81 by skipping step S86.

Namely, as shown in FIG. 23, rotating the jog dial 4 upward until the thumbnail icon in the upper right corner is displayed as a selected thumbnail icon allows to repeatedly scroll all thumbnail icons to the right or to the lower left.

If, in step S82, the jog dial 4 is found rotated downward, then the procedure goes to step S87, in which the content browsing program 54D determines whether the thumbnail icon at the right end of the thumbnail icons aligned in a planar manner is displayed as a selected thumbnail icon. If this thumbnail icon is found not displays as a selected icon, then the procedure goes to step S88.

In step S88, the content browsing program 54D scrolls all thumbnail icons to the left by an amount equivalent to the rotational angle of the jog dial 4, upon which the procedure returns to step S81.

If, in step S87, the thumbnail icon at the right end is found displayed as a selected thumbnail icon, then the procedure goes to step S89, in which the content browsing program 54D determines whether the thumbnail icon in the lower left corner is displayed as a selected thumbnail icon or not. If this thumbnail icon is found not displayed as a selected thumbnail icon, then the procedure goes to step S90.

In step S90, the content browsing program 54D widely scrolls all thumbnail icons to the upper right, upon which the procedure returns to step S81.

If, in step S89, the thumbnail icon in the lower left is found displayed as a selected thumbnail icon, then the procedure returns step S81 by skipping the process of step S90.

Namely, as shown in FIG. 27, rotating the jog dial 4 downward until the thumbnail icon in the lower left corner is displayed as a selected thumbnail icon allows to repeatedly scroll all thumbnail icons to the left or to the upper right.

If, in step S81, the jog dial 4 is found not rotated, then the procedure goes to step S91, in which the content browsing program 54D determines on the basis of a monitor result supplied from the jog dial status monitor program 70F whether the jog dial 4 has been pressed or not. If the jog dial 4 is found pressed, the procedure goes to step S91. It should be noted that the pressing of the jog dial 4 determined in step S91 is executed by the user to view the content item represented by the selected thumbnail icon.

The process of step S92 is the same as the process of step S8 shown in FIG. 10 (described with reference to the flowcharts of FIGS. 11 and 12) and therefore need not be described.

Thus, operating the jog dial 4 allows the user to easily browse the thumbnail icons displayed in various forms.

Figure 29:
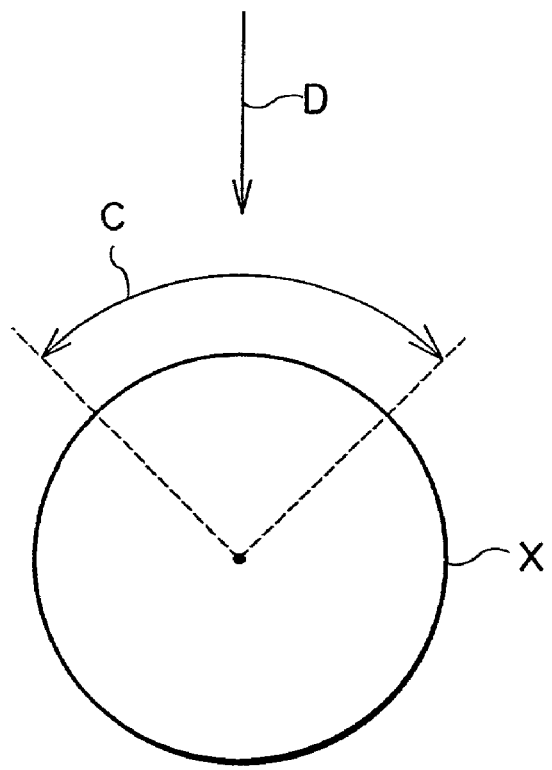
FIG. 29 is a diagram illustrating a dial X.

In the above, contents are browsed by use of the jog dial 4 for example. It will be apparent that contents can also be browsed by use of a dial X which is limited in rotation to a predetermined angle as shown in FIG. 29. In this case, the operation in the direction indicated by arrow C corresponds to the rotary operation of the jog dial 4 and the operation in the direction indicated by arrow D corresponds to the pressing of the jog dial 4.

Figure 30:
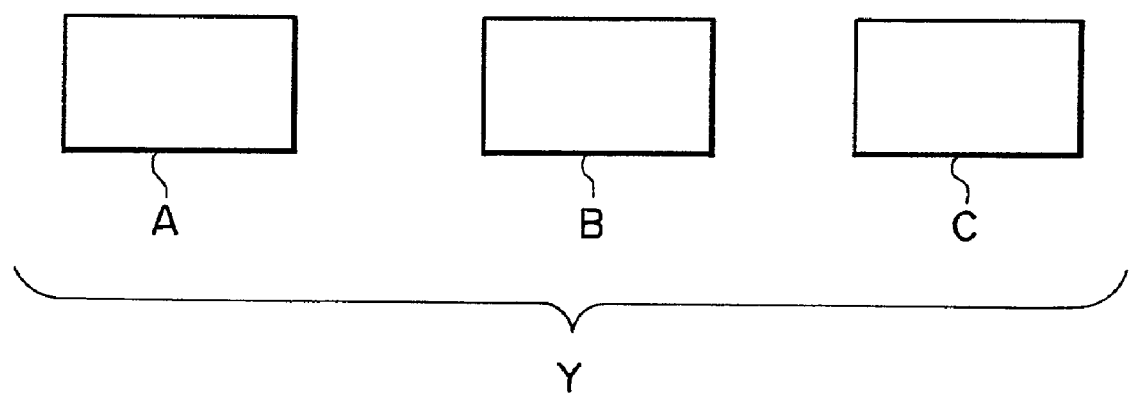
FIG. 30 is a diagram illustrating a button group Y.

Also, as shown in FIG. 30, contents can be browsed by use of a button group Y comprising three buttons A through C. In this case, the operation of button A corresponds to the upward rotation of the jog dial 4 and the operation of button C corresponds to the downward rotation of the jog dial 4. The operation of button B corresponds to the pressing of the jog dial 4.

In addition, contents can also be browsed by use of cursor keys.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

This storage medium is a package medium which is constituted by the magnetic disc 121 (including floppy disc), the optical disc 122 (including CD-ROM and DVD), a magneto-optical disc 123 (including MD), or the semiconductor memory 124 to be distributed to the user separately from the computer as shown on FIG. 5.

It should be noted that the steps describing the programs to be stored in the program storage medium are not only executed in a time-dependent manner in the order described, but also in parallel or in a discrete manner.

According to the information processing apparatus and the method and the program storage medium associated with the present invention, the displaying of the browsing images representing contents stored in a recording medium is controlled in response to a first operation or a second operation executed through operating means. Consequently, the browsing of contents can be performed with ease.

What is claimed is:

1. An information processing apparatus, comprising:

first generation means to generate a first image for browsing corresponding to first data;

second generation means to generate a second image for browsing corresponding to second data;

first designation means to designate display positions of the first image and the second image along a virtual line so that the first image overlaps at least a portion of the second image; and a first operating dial to display the first image and the second image at the display positions designated by the first designation means, wherein said first operating dial is a rotating or turning type dial, wherein said first operating dial controls the display of the first image and the second image such that the first image and the second image are aligned with a set of images in a curve which constitutes a circle, spirally with a set of images in a three-dimensional space or with a set of images in a planar manner.

2. The information processing apparatus according to claim 1, wherein said first operating dial controls the display of the first image and the second image such that the first image and the second image are linearly aligned with a set of images.

3. The information processing apparatus according to claim 1, further comprising:

second operating means for performing a first operation, a second operation or a third operation based on a user operation;

selecting means for selecting, in accordance with the first operation or the second operation performed through the second operating means, one of the first image and the second image displayed by the first operating dial; and reproduction means for reproducing data corresponding to the one of the first image and the second image selected by selecting means when the third operation has been performed.

4. The information processing apparatus according to claim 3, further comprising:

second display control means for controlling, in accordance with said first operation or said second operation performed through said second operating means, the display of an icon of an application program which uses said content to be reproduced by said reproduction means; and starting means for starting, if said third operation is performed through said second operating means with the display of an icon of a predetermined application program maintained in an active state by said second display control means, said predetermined application program of which display of an icon is maintained in the active state.

5. The information processing apparatus according to claim 4, wherein, when any display of the icon of said application program is not maintained in the active state by said second display control means and said third operation is performed through second operating means, said starting means ends said application program.

6. The information processing apparatus according to claim 3, wherein each of said first operation and said second operation is performed by rotating or turning a dial.

7. The information processing apparatus according to claim 3, wherein said third operation is performed by depressing a dial.

8. The information processing apparatus according to claim 3, wherein said first operation, said third operation, and said second operation are performed by switches arranged substantially in straight-line.

9. An information processing method, comprising:

a first generation step for generating a first image for browsing corresponding to first data;

a second generation step for generating a second image for browsing corresponding to second data;

a first designation step for designating display positions of the first image and the second image along a virtual line so that the first image overlaps at least a portion of the second image; and a first operating step for displaying the first image and the second image at the display positions designated by the first designation step by rotating or turning a rotating or turning type dial, wherein said first operating step controls the display of the first image and the second image such that the first image and the second image are aligned with a set of images in a curve which constitutes a circle, spirally with a set of images in a three-dimensional space or with a set of images in a planar manner.

10. The information processing method according to claim 9, further comprising:

a second operating step for performing a first operation, a second operation or a third operation based on a user operation;

a selecting step for selecting, in accordance with the first operation or the second operation performed through the second operating step, one of the first image and the second image displayed by the first operating step; and a reproduction step for reproducing data corresponding to the one of the first image and the second image selected by selecting step when the third operation has been performed.

11. The information processing method according to claim 10, wherein each of said first operation and said second operation is performed by rotating or turning a dial.

12. The information processing method according to claim 10, wherein said third operation is performed by depressing a dial.

13. The information processing method according to claim 10, wherein said first operation, said third operation, and said second operation are performed by switches arranged substantially in straight-line.

14. A program storage medium for storing a computer-readable program for controlling an information processing apparatus, comprising:

a first generation step for generating a first image for browsing corresponding to first data;

a second generation step for generating a second image for browsing corresponding to second data;

a first designation step for designating display positions of the first image and the second image along a virtual line so that the first image overlaps at least a portion of the second image; and a first operating step for displaying the first image and the second image at the display positions designated by the first designation step being controlled by rotating or turning a rotating or turning type dial, wherein said first operating step controls the display of the first image and the second image such that the first image and the second image are aligned with a set of images in a curve which constitutes a circle, spirally with a set of images in a three-dimensional space or with a set of images in a planar manner.

15. The program storage medium according to claim 14, further comprising:

a second operating step for performing a first operation, a second operation or a third operation based on a user operation;

a selecting step for selecting, in accordance with the first operation or the second operation performed through the second operating step, one of the first image for browsing and the second image for browsing displayed by the first operating step; and a reproduction step for reproducing data corresponding to the one of the first image for browsing and the second image for browsing selected by selecting step when the third operation has been performed.

16. The program storage medium according to claim 15, wherein each of said first operation and said second operation is performed by rotating or turning a dial.

17. The program storage medium according to claim 15, wherein said third operation is performed by depressing a dial.

18. The program storage medium according to claim 15, wherein said first operation, said third operation, and said second operation are performed by switches arranged substantially in a straight-line.

* * * * *